(12) United States Patent
Nygaard

(10) Patent No.: US 7,494,178 B2
(45) Date of Patent: Feb. 24, 2009

(54) VEHICLE AND A STRENGTHENING MEMBER FOR A VEHICLE

(76) Inventor: Jens H. S. Nygaard, Ed. Balcon de Europa, Pt.5 1E, ES-29780 Nerja-Malaga (ES)

( * ) Notice: Subject to any disclaimer, the term of this patent is extended or adjusted under 35 U.S.C. 154(b) by 0 days.

(21) Appl. No.: 10/594,008

(22) PCT Filed: Mar. 24, 2005

(86) PCT No.: PCT/IB2005/000985
§ 371 (c)(1),
(2), (4) Date: Feb. 26, 2007

(87) PCT Pub. No.: WO2005/092671
PCT Pub. Date: Oct. 6, 2005

(65) Prior Publication Data
US 2007/0194604 A1 Aug. 23, 2007

(30) Foreign Application Priority Data
Mar. 29, 2004 (GB) ................... 0407047.0

(51) Int. Cl.
*B60R 21/06* (2006.01)
*B60R 21/08* (2006.01)
*B60R 21/13* (2006.01)

(52) U.S. Cl. ............... 296/187.01; 180/274; 280/748; 296/95.1; 296/193.06

(58) Field of Classification Search ............ 180/274; 280/748, 749, 751, 752, 753, 756; 293/15, 293/24, 38, 112; 296/84.1, 95.1, 187.01, 296/187.04, 187.05, 96.18, 193.06
See application file for complete search history.

(56) References Cited

U.S. PATENT DOCUMENTS

| | | | | | |
|---|---|---|---|---|---|
| 1,146,666 | A | * | 7/1915 | Strickler | 280/748 |
| 1,334,740 | A | * | 3/1920 | Crowell | 296/96.18 |
| 1,534,377 | A | * | 4/1925 | Furiate | 160/237 |
| 2,062,328 | A | * | 12/1936 | Morrison | 293/135 |
| 2,180,912 | A | * | 11/1939 | Rogers | 280/753 |
| 2,194,390 | A | * | 3/1940 | Hubbard | 180/274 |
| 2,495,662 | A | * | 1/1950 | Scraper | 296/95.1 |
| 2,586,063 | A | * | 2/1952 | Kurtz | 280/749 |

(Continued)

FOREIGN PATENT DOCUMENTS

DE        4236458 A1  *  5/1994

(Continued)

*Primary Examiner*—Glenn Dayoan
*Assistant Examiner*—Paul A Chenevert
(74) *Attorney, Agent, or Firm*—Dickstein Shapiro LLP

(57) ABSTRACT

The present invention provides a road vehicle having at least one strengthening member fixed to a structure of the vehicle, preferably extending adjacent to a front windscreen of the vehicle, between lateral edges of the front windscreen, wherein the strengthening member is dimensioned so that it will not prevent the driver from seeing an object which is at least two meters from the front windscreen. The present invention may further provide a road vehicle having at least one strengthening member which retracts to a first position and extends to a second position, and is movable from the first position to the second position. A particular type of strengthening member is formed of at least three first linearly extending structural units for extending from the front structure of the vehicle and second linearly extending structural unit joining the at least three first linearly extending units.

11 Claims, 23 Drawing Sheets

U.S. PATENT DOCUMENTS

| | | | | |
|---|---|---|---|---|
| 2,757,040 | A * | 7/1956 | McLelland | 280/749 |
| 2,799,530 | A * | 7/1957 | Drake | 296/106 |
| 2,933,343 | A * | 4/1960 | Potts | 280/749 |
| 3,037,809 | A * | 6/1962 | Praha | 280/749 |
| 3,650,542 | A * | 3/1972 | Shimano et al. | 280/749 |
| 3,770,313 | A * | 11/1973 | Jimenez | 296/95.1 |
| 3,814,459 | A * | 6/1974 | Eckels | 280/753 |
| 4,442,881 | A * | 4/1984 | Monteath et al. | 160/25 |
| 4,807,925 | A * | 2/1989 | Sakamoto et al. | 296/203.02 |
| 5,009,463 | A * | 4/1991 | Saitoh et al. | 296/210 |
| 5,547,219 | A * | 8/1996 | Ha | 280/749 |
| 5,653,497 | A | 8/1997 | Campfield et al. | |
| 5,660,414 | A * | 8/1997 | Karlow et al. | 280/749 |
| 5,860,689 | A | 1/1999 | Campfield et al. | |
| 5,941,596 | A * | 8/1999 | See | 296/201 |
| 6,415,883 | B1 * | 7/2002 | Myrholt et al. | 180/274 |
| 6,669,275 | B2 * | 12/2003 | Frasher et al. | 296/203.02 |
| 2002/0171263 | A1 * | 11/2002 | Frasher et al. | 296/203.02 |
| 2003/0213635 | A1 * | 11/2003 | Ryan et al. | 180/274 |
| 2004/0129853 | A1 * | 7/2004 | Suzuki et al. | 248/475.1 |
| 2005/0280253 | A1 * | 12/2005 | Queveau et al. | 280/756 |
| 2007/0216189 | A1 * | 9/2007 | Matsumoto et al. | 296/96.21 |

FOREIGN PATENT DOCUMENTS

| | | |
|---|---|---|
| DE | 199 32 114 | 8/2000 |
| DE | 100 46 764 | 4/2002 |
| EP | 258642 A1 * | 3/1988 |
| EP | 1 186 483 | 3/2002 |
| FR | 603 466 | 4/1926 |
| FR | 935 239 | 6/1948 |
| GB | 961 121 | 6/1964 |
| GB | 961 122 | 6/1964 |
| JP | 2000168619 A * | 6/2000 |
| JP | 2004255915 A * | 9/2004 |
| JP | 2004338528 A * | 12/2004 |
| JP | 2006044569 A * | 2/2006 |
| WO | WO 01/03977 | 1/2001 |

* cited by examiner

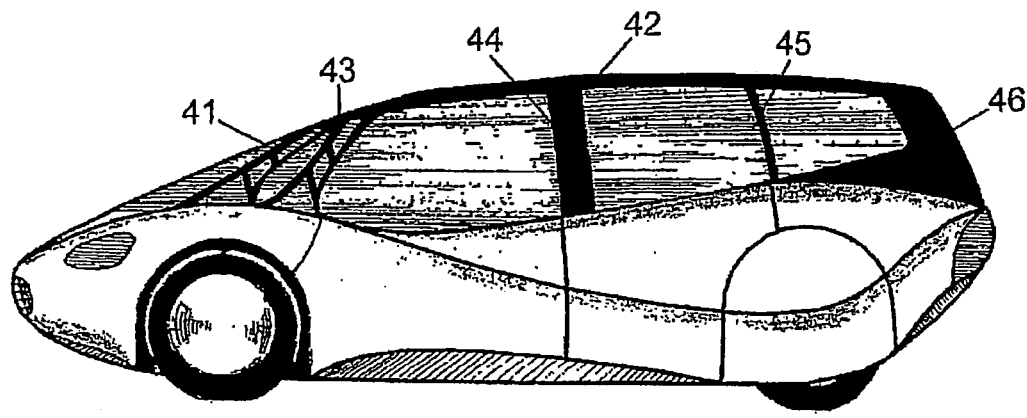
Fig. 24
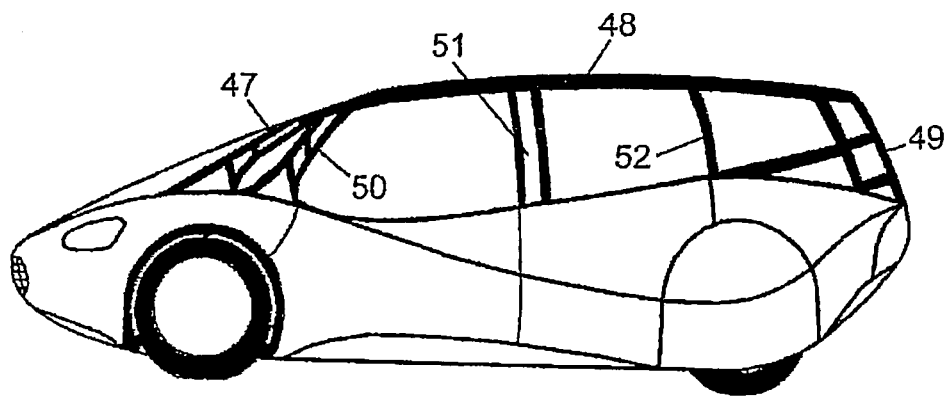
Fig. 25
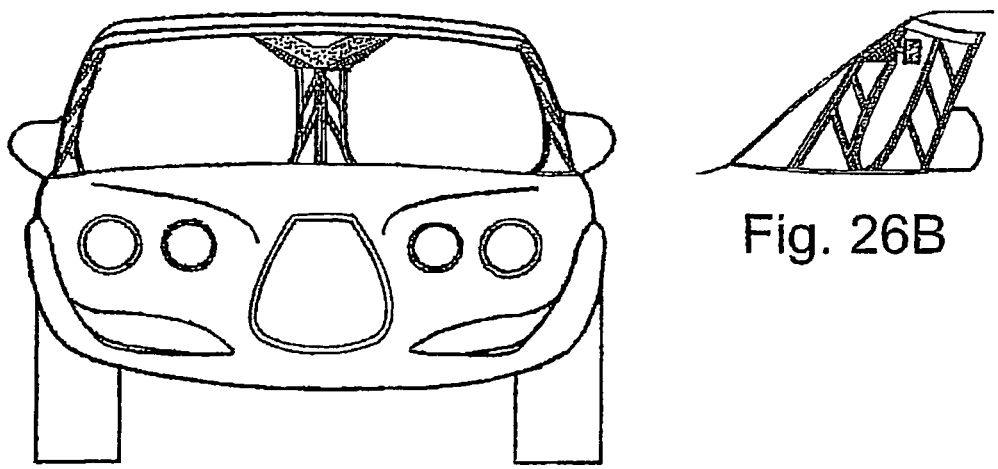
Fig. 26A
Fig. 26B

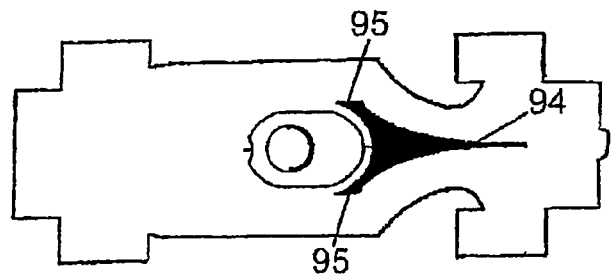
Fig. 63     Fig. 64
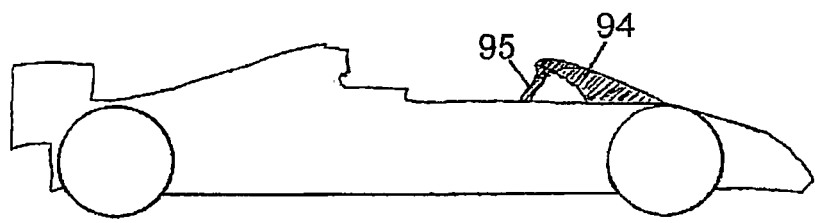
Fig. 65
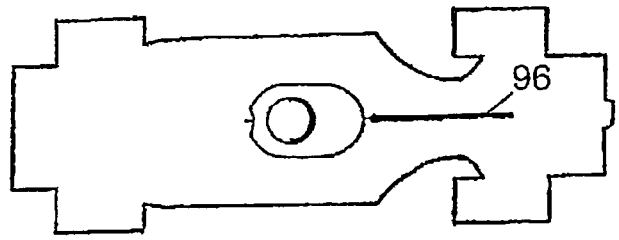
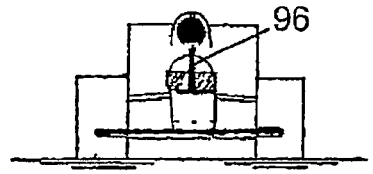
Fig. 66     Fig. 67
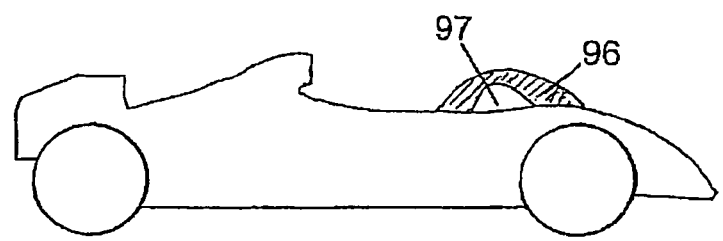
Fig. 68

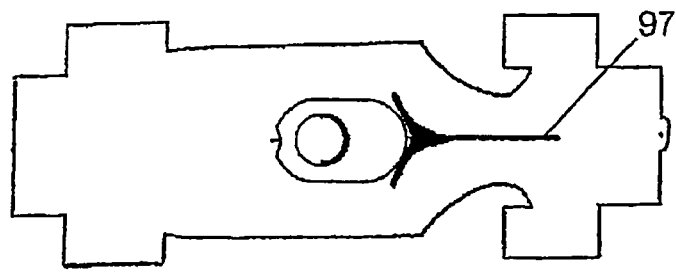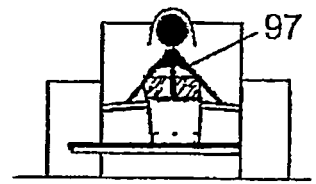
Fig. 69    Fig. 70
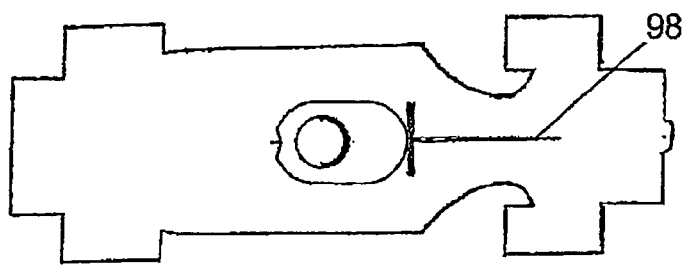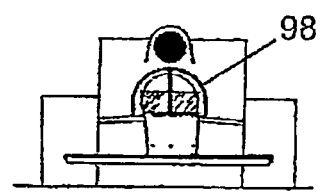
Fig. 71    Fig. 72
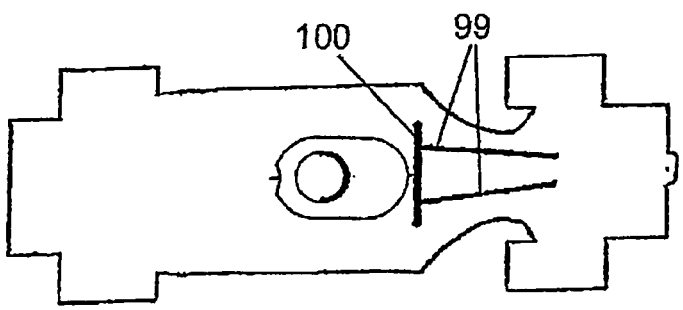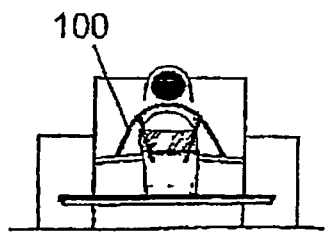
Fig. 73    Fig. 74

VEHICLE AND A STRENGTHENING MEMBER FOR A VEHICLE

The present invention relates to structural reinforcements for the vulnerable areas of a vehicle, such as a road vehicle.

Many fatalities occur annually in road vehicle accidents. A proportion of these fatalities result from "looking but not seeing", caused by obstruction of field of vision by structures of the vehicle such as a-pillars, or from rollover roof crush or impact through the windscreen, which form the most dangerous forms of accident.

A number of systems have been employed in the past to reduce the effect of these accidents. For example, in U.S. Pat. No. 5,653,497 and U.S. Pat. No. 5,860,689 the windscreen is protected from roof crush by placing an impact resistant barrier around the periphery of the windscreen. The strengthening this provides only extends to the windscreen itself and there is some problem with an effect on peripheral vision through the windscreen.

It is also known in the field of motor racing to customize vehicles by welding in extra strengthening members. However, these strengthening members are not appropriate for normal vehicles, because they are very obstructive and potentially dangerous for persons traveling the vehicle. They can obstruct the space within the vehicle and obstruct vision.

Sports utility vehicles (SUV) are commonly provided with roll bars which are intended to provide vertical protection in a rollover accident, but are unable to protect against windscreen impacts. A number of systems have been provided in which the bonnet of a vehicle is raised upon impact, for example by the operation of impact sensors, but the protective effect is not found to be sufficient and the driver is not able to see through the bonnet when it is raised, which is extremely hazardous. This can be a problem particularly for drivers with short backs or where the seat is too low.

EP-A-1186483 discloses pop-up roll bars which may be located behind the seat of a vehicle, particularly a soft-top vehicle which spring into position behind the driver's head in the case of impact. However, they are not able to provide any protection to a windscreen impact from the front and have limited protection against roof crush.

The present inventor has set out to provide a strengthening member for a vehicle for protecting the driver or passengers in the vehicle from rollover roof crush and from penetration of objects through the windscreen.

Accordingly, in a first aspect, the present invention provides a road vehicle comprising at least one strengthening member fixed to a structure of the vehicle, and extending in front of the driver's position, the strengthening member being dimensioned so that it will not prevent the driver seeing an object which is at least 2 m from the front windscreen, when the driver uses binocular vision and without requiring the driver to move the driver's head.

The inventor has realized that the conventional belief that optimum vision can only be obtained if there are no structural components between the driver and the windscreen is not correct. The inventor has realized that a strengthening member can be designed which has minimal visual impact but which significantly enhances the strength of the vehicle, in particular resistance to impacts from the front and roof crush.

The first aspect of the invention also provides a strengthening member for use in a road vehicle, for fixing to a structure of the vehicle, and for extending in front of the driver's position, the strengthening member being dimensioned so that, when in use, it will not prevent the driver seeing an object which is at least 2 m from the front windscreen, when the driver uses binocular vision and without requiring the driver to move the driver's head.

In a conventional road vehicle, the present invention preferably provides at least one strengthening member extending between the front structure of a vehicle and a top frame of the front windscreen.

The strengthening member of the present invention can also be applied to vehicles, which are not constructed in the same way as a normal road vehicle, for example formula racing cars or unconventional energy saving vehicles, which are currently being experimented with. Many of these vehicles have a pod-like curved windscreen which extends around the driver and/or passengers. Where the vehicle has a windscreen, whether in a conventional vehicle or an unconventional vehicle, the strengthening member is preferably fixed to a structure of the vehicle and extending adjacent the front windscreen, the strengthening member extending between lateral edges of the front windscreen. In some racing cars, there is no windscreen at all, in which case the strengthening member can be provided extending in front of the driver's position.

By "in front of the driver" it is meant that the strengthening member is located ahead of the driver's position, along the longitudinal axis of the vehicle, when seen in side view. It is not necessary that the strengthening member is placed directly in front of the driver's position. Many vehicles are designed with a notional centre line. The driver's position is conventionally located to one side of this centre line. In this case, the strengthening member may be located on the centre line, on the same side of the centre line of the driver's position or to the other side. Preferably, it is located substantially on the centre line.

The present inventor has also realized that movable strengthening members can be provided which move from a storage position in which they are not substantially visible to the driver when looking straight ahead, to a reinforcing position extending between structural members of the vehicle. In this aspect of the invention, the reinforcing member is substantially or completely invisible during normal use of the vehicle, being only put into position in the case of an accident.

Accordingly, in the second aspect, the present invention provides a vehicle comprising at least one strengthening member which, in a first, storage position is retracted and in a second, extended position, extends between structures of the vehicle, and operating means for moving the strengthening member from the first position to the second position, wherein if the reinforcing member is for extending adjacent the front windscreen in the extended position, it remains possible for the driver to see through at least part of the front windscreen.

The second aspect of the invention further provides a strengthening structure for mounting in a vehicle, the strengthening structure comprising a strengthening member and operating means for moving the strengthening member from a first, storage position to a second, extended position, the operating means and the strengthening member being configured to engage structures of the vehicle.

One embodiment of the design of strengthening member for use in the first aspect of the invention is considered to be inventive its own right. Accordingly, a third aspect of the inventions provides a strengthening member for mounting in a vehicle, formed of at least two first linearly extending structural units for extending from the front structure of the vehicle and second linearly extending structural units joining the at least two first linearly extending units, the second structural units being not horizontal, and wherein the first linearly extending structural units of the strengthening member have a width in the horizontal plane not exceeding 65 mm, preferably not exceeding 50 mm.

The horizontal plane is taken to be the plane which will be horizontal when the strengthening member is put in position.

Preferably, in the third aspect of the invention, there are at least three first linearly extending structural units.

In the second and third aspects, the vehicle is preferably a road vehicle. However, the inventions are inherently applicable to all cabin-spaces with occupants of vehicles or vessels, whether static or traveling on road, racetrack, in the air and space, or at sea.

In the first, second and third aspects, the vehicle is preferably a passenger carrying road vehicle.

Preferred features of the first, second and third aspects of the invention will be described below in more detail.

Throughout the present description, reference will be made to conventional passenger motor cars. Conventional passenger motor cars have eight parts which are traditionally thought to have an influence on roof crush resistance:

The outer a-pillar, the outer b-pillar, the side panel, the inner rear reinforcement hinge pillar, the reinforcement lower hinge pillar, the b-pillar, the inner a-pillar, the roof side frame and roof side panel. Reference will be made to these structures throughout where necessary.

First Aspect-Fixed Strengthening Member

Preferably, as noted above, the vehicle has a windscreen and the strengthening member extends adjacent to the front windscreen of the vehicle, extending between lateral edges of the front windscreen.

By "extends adjacent the front windscreen" it is meant that the strengthening member is located either in front of the windscreen or between the driver and the front windscreen. Preferably, the strengthening member is placed either abutting the front windscreen or spaced from it by a small distance, for example in the range 2-20cm, as explained further below.

It is particularly preferred that the reinforcing member is located inside the passenger compartment of the vehicle. This has the particular advantage of being able to arrest the windscreen in the case of a collision, as will be described further below. It also places the strengthening member in a position in which it is less likely to obstruct vision of the offside carriage way of a road.

The strengthening member must be fixed to at least one structure of the vehicle. This may be the front structure of the vehicle or a top frame of the front windscreen. Preferably, as noted above, in a conventional vehicle, the strengthening member extends between and is fixed to the front structure of the vehicle and the top frame of the window. This provides a strong structure and the greatest degree of crush resistance in the case of the rollover.

The strengthening member is optionally removable to be taken out and re-installed manually. The strengthening member may then be securely locked in place, for example with a rapid solid bolt-system/slither, made to suit each individual road-car or motor-sport-car design (easy clip quick-lock/screw-lock bolt system similar to convertible roof fastening mechanisms). Further, the whole windscreen with the strengthening member and optionally two A-pillars may thus be removable, for example for convertibles.

The strengthening member may be integrally formed with at least one of the windscreen, the instrument panel beam or a front exterior structure of the vehicle.

It is noted that, in many vehicles the front windscreen is swept back at a substantial angle to the vertical. This means that the top part of the windscreen and the top frame of the front windscreen are located relatively close to the level of the driver's head. By providing the strengthening member adjacent the top frame of the front windscreen, good support in the case of a rollover can be provided. Additional strengthening members can be provided as discussed further below.

It is possible that the strengthening member should only extend for a part of the length of the front windscreen. Preferably, however, it extends for at least 75% of the length of the front windscreen.

A strengthening member can have structural and deflective safety properties while having an opening, or a partial opening, at some area in front of or below the typical position of the interior rear-view-mirror.

The strengthening member suitably extends in the direction of the front-rear axis of the vehicle. However, it may be slightly inclined with respect to this axis, when seen in top plan view, if appropriate.

Additional strengthening members may be provided extending between the top frame of the front windscreen, along the roof structure to the top frame of the rear windscreen, and/or from the top frame of the rear windscreen to a rear structure of the vehicle. These may be formed continuously with the strengthening member which is placed adjacent the front windscreen. They may be formed of separate components which are then placed extending contiguously with one another. They may be connected by any suitable method, for example bonding, welding, gluing or mechanical fixing.

It is particularly preferred that the present invention provides a strengthening member according to the first aspect of the invention in the form of an arch. It may provide a smoothly curving arch. By "smoothly curving" it is meant that at least one edge of the arch comprises no section in which the radius of curvature is less than 5 mm and preferably not less 10 mm, most preferably not less than 20 mm.

The strengthening member may be built up from a single structural member or a plurality of structural members connected together.

The strengthening member may be made of at least one structural member which, in cross section has a smoothly curving profile on the faces which face into the passenger compartment.

The strengthening member may be made of structural members which, in cross section, are solid or hollow.

In order to allow the strengthening member to be placed adjacent the front windscreen, the three-dimensional configuration of the strengthening member is preferably designed as follows.

The member may become narrower in the direction towards the front of the vehicle. It is parts of the structure which are furthest from the driver which are most likely to interfere with the driver's vision and it is desired to make these as small as possible.

The structure may become narrower from top to bottom, in the direction of the width of the vehicle. This allows parts near the base of the windscreen, which are most likely to obstruct the driver's vision, to be made small whilst providing a strong engagement with other parts of the vehicle at the top. This can be achieved by giving the strengthening member a V shape or Y shape when seen from the front. In side-view, the strengthening member may become narrower from the bottom to top, to provide a rigid strut like structure. Alternatively, it may be substantially the same length in the direction of the vehicle, from top to bottom, as long as this does not interfere with driver's vision.

The strengthening member may, in side view, be swept back from bottom to top, as this is the configuration of windscreens of almost all vehicles.

In one embodiment, the strengthening member has the form of a triangular prism which has been sheared in the vertical plane, or a truncated sheared triangular pyramid.

In all embodiments, the strengthening member is preferably not solid, to further reduce visual obstruction. It may be made of perforated material or webs of solid material surrounding spaces. Alternatively, it may be constructed out of linearly extending structural units combined together to provide a strong structure with minimal visual intrusion.

The strengthening member may be formed of at least two first linearly extending structural units extending from the front structure of the vehicle to the top frame of the front windscreen and second linearly extending structural units joining the at least two first linearly extending structural units. In this case, the second structural units are preferably mounted so that they are not horizontal. This further reduces the tendency to obscure parts of the field of vision of the driver. There may be three of the first linearly extending structural units, each joined to the other two by second structural units. The three linearly extending structural units may be positioned in a triangular arrangement.

A strengthening member can be produced by cutting and folding from one sheet of material into the final shape. Laser-cutting, hydro-forming, welding if required, or any manufacturing technique may be used.

Honeycomb sandwich structure composite materials of any nature may be used for example steel/titaniuml/carbon fibre/KEVLAR™/ plexi/reinforced polyamide 66/Glassfibre-reinforced PP, or any new alloy).

To further minimize visual obstruction, the strengthening member may be configured with a front structural unit and a rear structural unit, the front and rear structural unit lying substantially in line with the normal position of the driver for driving. In this way, although there are two structural members giving strength, only a single unit is seen by the driver when viewed with one eye and visual intrusion is minimized when viewed with both eyes.

Preferably, the first linearly extending structural units of the strengthening member have a width in the horizontal plane not exceeding 65 mm, preferably not exceeding 5 cm, most preferably not exceeding 3.5 cm, to minimize visual obstruction. The first linearly extending structural units of the strengthening member preferably have a width in the horizontal plane which does not exceed the distance between the eyes of the driver. Most drivers have an eye separation falling in the range 5.5-6.5 cm. The width of the structural unit is preferably less than this and preferably less than 65% of minimum normal eye separation. The horizontal plane is taken to be the plane which will be horizontal when the strengthening member is in position in a vehicle in the normal upright configuration of the vehicle.

Preferably, the second structural units have a width in the horizontal plane which is less than 65 mm, preferably less than 50 mm. Preferably, they are not horizontally aligned.

Preferably, the separation between the first linearly extending structural units in the horizontal, plane is at least 65 mm.

If the maximum width of the structural units is equal to 50% of the eye separation of the driver, the driver will be able to see, using at least one eye, any object which is the same distance away from the structural units as the distance from the driver to the structural unit. As the normal distance from the driver to the strengthening member will be less than 1 m, the driver will be able to see objects which are around 1 m or more away from the strengthening member.

It is noted that, where the strengthening member is placed adjacent the front windscreen, for example centrally, it should have a lower visual intrusion than the type of front a-pillar conventionally used. These are typically constructed of solid, visually obstructive material and of a thickness wider in the horizontal-plane than the eye separation of a driver.

In practice, the vision of the driver is considered to be acceptable if not more than 6° of visual field is obstructed by the strengthening member.

The strengthening member is preferably mounted so that it does not contact the front windscreen along the whole length of the strengthening member. Preferably the strengthening member contacts the windscreen for less than 50% preferably less than 40% and preferably less than 20% of its length. Preferably, parts of the windscreen where the strengthening member contacts the windscreen are restricted to upper parts of the windscreen, for example in the area of the centrally mounted rear view mirror. This further reduces visual obstruction.

It also has the benefit of not increasing the stiffness of the lower part of the windscreen, but providing increased ability to absorb impact. In particular, it has been observed that in many types of impact collision with the windscreen, for example during collision with a cyclist or pedestrian, the cyclist or pedestrian frequently contacts the lower part of the windscreen. This in fact is often made head first, causing many fatalities. By providing a space between the strengthening member and the lower part of the windscreen, the lower part of the windscreen is enabled to flex a short distance, absorbing some of the energy of collision. However, it is then arrested by the strengthening member before moving backwards any further, preventing the windscreen or the object striking the driver.

The strengthening member itself may be designed with energy—absorbing properties. In particular, the portion of the strengthening member furthest away from the driver may be made so that it will flex or crumple upon impact, to absorb impact. This is particularly the case where the strengthening member is designed so that it increases in width from front to back, so that the front is relatively lightly constructed. It is desirable to design the strengthening member so that it will deflect for approximately 10-20 cm in case of collision from the front or a rollover preferably 10-12 cm. However, preferably it will not move so far as to endanger the driver.

The strengthening members according to the present invention may be manufactured from cast, pressed, forged or built up structures.

Strengthening members according to the present invention may be finished on the inside, where they face the passenger compartment, with impact absorbing material, for example expanded elastomeric material or padding similar to the upholstery of the interior of a vehicle, and in accordance with legislation relating to vehicle construction.

A strengthening member according to the present invention should extend from at least one fixed structure adjacent a panel or window of the vehicle, for example a frame for a window. This gives it a firm fixing position. Preferably, it extends between structures of the vehicle located on opposite edges of the panel or vehicle, to form a strong bridge between these structures, thereby augmenting the structural strength of the vehicle.

Additional strengthening members may also be provided. At least one strengthening member may be provided in contact with the vehicle roof. This is particularly applicable in hard top/cabriolet cars. The strengthening member may continue spanning the roof as the spread profiles backwards along the central roofline/cover connecting with the roof cross profiles between the pillars for additional support. Preferably, the strengthening member contacts the upper rear window frame. Preferably, there is a strengthening member in contact with the rear windscreen along substantially its whole length to the lower end of the rear window area.

When a strengthening member is provided adjacent the roof, this can provide additional reinforcement, for supporting roof box loads. It also provides a possibility of a central longitudinal roof rail for more secure attachment of miscellaneous cargo carrying devices on the roof.

This can provide resistance to impacts against the front windscreen, roof or rear windscreen. The structure can integrate with existing vehicle structures to enhance the total strength of the whole combination. Connection between strengthening members and the rear windscreen or the roof may be of any suitable means, for example, adhesive or mechanical connections. Longitudinal strengthening members may be additionally provided extending for example along the transverse edges of the front windscreen, roof, or rear windscreen. Transverse strengthening members may be provided extending from the a-pillar, b-pillar or c-pillar towards a strengthening member mounted adjacent the front windscreen, roof or rear windscreen as appropriate. This can provide additional rigidity and strength. Further, internal strengthening members extending from the vehicle chassis to the roof or to a strengthening member adjacent to the roof may be provided within the vehicle to provide additional resistance to crushing.

The additional strengthening members may be constructed in the same way as the strengthening member of the invention. For example, for lightness, they are preferably constructed out of light material. Preferably, they are constructed with lightening spaces in their structure. Preferably, they are constructed from a plurality of linearly extending structural units.

In a particularly preferred embodiment, the structural design of the strengthening member of the invention may be applied to the structure of conventional pillars of the vehicle, including the a-pillars, b-pillars or c-pillars. In this way, the visual obstruction to the driver to the sides can be improved.

In particular, these components of the vehicle are preferably each configured so that they do not prevent the driver seeing an object which is at least two meters from the respective structure of the vehicle, and preferably at least one meter from the respective structure of the vehicle, when the driver uses binocular vision and without requiring the driver to move the driver's head.

Each of the a- pillars, b- pillars or c- pillars is preferably not solid, to further reduce visual obstruction. Each may be formed of perforated material or webs of solid material surrounding spaces. They may each be constructed from a linearly extending structural units combined together to provide a strong structure with minimal visual intrusion. They may each be formed of at least two first linearly extending structural units and other linearly extending structural units joining the at least two linearly extending structural units. In this case, the second structural units are preferably mounted so that they are not horizontal. Preferably, structural units of the a-pillar have a width not exceeding 65mm, preferably not exceeding 50mm, most preferably not exceeding 3.5cm, to minimize visual obstruction.

In one preferred embodiment, all of the strengthening member according to the invention adjacent front windscreen, the a-pillars and the b-pillars and, optionally, the c-pillars are formed according to the principles of the constructions of the strengthening member of the invention. Preferably, they are all constructed with lightening spaces in them, being preferably all constructed from a plurality of linearly extending members.

This can give a very open "cage like" structure to the vehicle, with very high degrees of vision to the front, to the sides and, optionally, to the rear as well. High strength for resisting impact can however be provided. If necessary, high strength/low weight materials may be used.

It is noted that the vision in the direction of the c-pillars is probably the least important and these parts can be made of solid structures in the conventional manner, to save costs.

It is an advantage of the present invention that, where a strengthening member is provided adjacent the front windscreen, it may be possible to form the a-pillars of the vehicle in a less bulky fashion than is the current practice. That is, they can be made smaller or they can be made of structures having spaces therein. In this way, good vision to the side can be obtained.

Tens of thousands of fatal accidents a year can be attributed to collisions with objects to the side of a vehicle. The additional strength provided to the centre of the windscreen by the strengthening member of the present invention will allow the a-pillars to be less visually obstructive and to reduce this kind of accident.

The windscreen may also be made wider than is normal. It may be so wide as to be directly adjacent to the side-windows of the doors, when seen from the exterior. The preferred method of securing the position of the windscreen onto the strengthening member and a-pillars is bonding on the outer edge of the strengthening member and a-pillars. A space between these members and the windscreen may be provided in selected places in order to benefit from the laminated windscreens inherent shock cushioning.

To further optimize the field of vision properties during all driving conditions, the windscreen may be formed or coated with a suitable material to reduce glare and dazzle, for example ITS variable electro-photo-chromatic ray screening capabilities to protect the driver from strong sunlight and reflections.

The safety benefit which can be obtained with the present invention include:
  Superior field of vision is possible for all driver/pilots compared to conventional designs
  Rollover roof crush protection
  Deflection protection from windscreen impacts.
  The provision of a physical barrier for external objects (including large mammals pedestrians etc.) penetrating into the passenger cabin through the windscreen, roof or rear window.
  Reduced ejection of driver/passengers in a crash, if they are not wearing seat belts.
  Windscreen support to improve resistance to cracks from stresses and impacts.
  Possible central secure attachment of heavy roof load/slid boxes, allowing an increased carriage of weight.
  Increased reinforcement to windscreen/frame/support-structure with significantly reduced risk of object impact/penetration in collision conditions with rollover impacts at multiple angles.
  Increased confidence of vehicle passengers relating to protection from top impacts, so that they will more readily wear seat belts.

In a preferred embodiment, the driver's seat is located in a fixed position, so that the position of the driver with respect to the strengthening member is substantially fixed. In this case, it will also be preferable that the controls of the vehicle are adjustable. For example, the steering wheel, seat, control handles and pedals may be adjustable so that they are at the right place for the driver. Such a positional alignment can be implemented automatically by sensors and electro-motors.

Also, or alternatively, the angle of the central strengthening member may be turned around its own axis, for example by a bolt/joint-system, manually or automatically, in order to align in the centre middle between the eyes of the driver, for optimal transparency.

The strengthening member (and, optionally, the a-pillars) may be asymmetrically aligned towards the position of the eyes of the driver for optimized transparency. The angle of the pillars may thus ensure that the material width in the horizontal plane is always significantly less than the width between the drivers' eyes, and most preferably less than 40mm, whilst allowing the structural units to have sufficient thickness to have strength. The space between structural units of the strengthening member should be 65mm or slightly more in the horizontal plane in order to ensure that material does not block the lines of vision as the individual pupils of the eyes are considered to be spaced no more than 65mm.

The present invention may also provide additional benefits including increase in chassis rigidity and torsional stability for improved road handling under load and less tiring road and wind noise, and improved driver alertness due to reduced strain from fear of collision. This can increase resistance to fatigue, better sensory perception, better coordination and better reaction times, due to efficient and rational cognition.

In order to prevent the additional structure provided by the strengthening member from increasing the weight of the vehicle excessively and raising the centre of gravity of the vehicle, it is desired to form it from light but very strong material.

The strengthening member may be formed of any suitable material, including modern light and strong materials such as metals, metal alloys (e.g. boron steel), composites including for example steel/titanium/aluminum/zinc/copper/steel and/or KEVLAR/synthetic-fibre/hyperstructures or other composite materials made using synthetic polymeric materials, or wood/polymeric material composite. Carbon fiber may be used. Transparent contemporary generation strength plastics may be used provided that the structures are aligned such that, with respect to the driver's position, they do not optically distort the driver's perception of the road, nor reflect sun-light unfavourably.

Where an additional strengthening member is mounted adjacent to the roof, it is preferably in contact with the roof to increase the strengthening effect and to reduce physical intrusion into the passenger compartment. This can reduce the danger of impact with passenger's heads and structures of the vehicle. The strengthening member may be provided with an impact-reducing surface on the inside, for example energy absorbing material such as padded upholstery or other resilient surfaces.

The structural elements of the strengthening member are suitably rounded in shape so that no sharp edges are presented which may cause injury to passengers.

A strengthening member according to the present invention may be provided for any suitable type of vehicle, including sports utility vehicles, multipurpose passenger vehicles (MPVs) sports cars, saloon cars/hatch backs, station wagon/estate cars, buses, trucks, people carriers or any other type of vehicle, as well as aircraft, spacecraft, trains or ships The present invention may be used for conventional designs of vehicle which have a front structure for housing an engine or for providing storage space and a rear structure for providing storage space or housing an engine. However, the invention may be applied to unconventional designs of vehicle in which the front structure of the vehicle comprises part of the vehicle frame. For example, the present invention may also be used in experimental types of vehicle in which machinery is mounted in longitudinally extending frame, the superstructure being built on the frame. The present invention can advantageously provide a strengthening member extending from a front part of such a frame (a front structure of the vehicle) for providing an additional protection behind the very large front windscreen.

The strengthening member of the present invention can be provided at relatively low cost. It can be provided as an additional item for insertion into an existing vehicle. Alternatively, it may be integrated with the vehicle structure during production in a simple, efficient fashion.

The reinforcing member of the present invention may provide a suitable mounting for additional devices, selected from:
1. a centre mounted windscreen wiper, having a high or centre windscreen pivot point;
2. a front windscreen de-mister;
3. a mounting for a rear view mirror;
4. a mounting for small high performance beam lights and/or hazard blinkers;
5. a mounting for instruments or warning lamps for the driver. These may be closer to the visual field of the driver than the dashboard.
6. monitor screens (for example rear view/dead-spot cameras of Siemens/VDO type;
7. sensors of various capacities.

Second Aspect of the Invention-Movable Strengthening Member

As noted above, the second aspect of the invention provides a vehicle with a strengthening member with two positions. The strengthening member is preferably positioned adjacent to the front windscreen in the second position, to resist impact.

The vehicle is suitably a road vehicle, preferably a passenger carrying road vehicle.

The operating means for moving the strengthening member from the first position to the second position may be activated by any suitable means. For example, it may be activated by the driver or by automatic means. Automatic means are preferable, as they may be configured with a much faster reaction time. For example, a detector means may be provided for determining if the vehicle has impacted an object, for example, a large mammal or cyclist or if the vehicle is starting to rotate at a dangerous angle which may lead to rollover. Alternatively, an object sensor may be provided for detecting objects located in front of the vehicle. For example, a short-range radar detector, or thermal detector may be provided configured to detect the spectrum of heat generated by a living body. Any combination of these sensors may be provided.

Suitable sensors are available to the person skilled in the art and they can be set at the correct sensitivity in order to move the strengthening member from the storage position to the first position to the second position under the correct conditions.

The first position may store the strengthening member either inside the passenger compartment of the vehicle, or outside the passenger-carrying compartment. Similarly, the strengthening member may lie inside the passenger compartment of the vehicle or outside it in the second position. Preferably the strengthening member is mounted inside the passenger compartment in the first position. This has the advantage that in the case of a collision, for example caused by an object striking the windscreen, if the reinforcing member is located within the vehicle, it will have time to react whereas if it were outside the vehicle, it would be too late. However, it may still be positioned outside the range of movement of driver/passengers therefore not producing further hazards.

As noted above in relation to the first aspect of the invention, a combination of a windscreen and a reinforcing member located behind the windscreen can provide a cushioning effect in that if the vehicle strikes a pedestrian, the pedestrian will initially contact the windscreen causing it to flex backwards and reduce the impulse delivered to the pedestrian, the windscreen and pedestrian being arrested by the reinforcing member.

The strengthening member is preferably configured so that, in the second position, it extends between any suitable structures of the vehicle, so that it is supported at both ends, giving a strong structure. The structural members may include windows or panels of the vehicle structure, but it is particularly preferred that the strengthening member should extend between frame components which are relatively rigid. The strengthening member may be mounted so that it moves to a second position in which it extends between the chassis and the roof or between the top structure of the rear windscreen and the rear of the vehicle. This may provide additional resistance to crushing. The strengthening member may be stored in the first position for example behind the seats of the vehicle. Receiving structures may be formed in the roof or along the top structure of the rear window to receive the reinforcing member.

For example, the strengthening member may be mounted so that, in the first position it is mounted behind or within the seat of the driver or the passengers and/or a head rest of the seat, and in the second position locks into to solid supports formed in the roof structure. This can provide direct protection to passenger's or driver's head in case of a roll over.

The operating means for moving the strengthening member from the first position to the second position may be any suitable means, for example, resilient means may be provided. The resilient means may bias the strengthening member from the first position to the second position, movement of the strengthening member being prevented until the means for the moving the strengthening member is activated, for example as described above.

The operating means for moving the strengthening member from the first position to the second position preferably moves the strengthening member very quickly from the first position to the second position. Suitably the strengthening member is moved from the first position to the second position in a time period of less than one second, more preferably less than 0.5 seconds and preferably around 0.1 seconds.

The strengthening member may be moved from the first position to the second position by any suitable type of motion. For example, it may be pivoted about a pivot located near or at an end of the strengthening member.

For example, at least one, preferably 2 and preferably at least 3 or 4 strengthening members may be pivoted centrally adjacent to the front windscreen. At least one strengthening member and preferably at least 2 strengthening members may be provided pivoted at each respective edge of the front windscreen. The pivot may be located on the lower edge or adjacent the upper edge of the windscreen.

The pivoting motion may be driven by a drive acting on the pivot itself or by a linkage acting at a position on the strengthening member displaced from the pivot, for example at the end of the strengthening member.

The strengthening member may be moved into position by extending substantially linearly. For example, it may comprise a telescopic structure having at least one part telescopically moveable with respect to a second part. The strengthening member may comprise a first part and a second part movable along the first part, the movement of the second part being guided by movement of a sliding member formed in one of the first and second parts in a track formed in the other of the second and first parts.

The strengthening member may be moved into position by sliding it into position. It may slide for example from a respective lateral edge of the windscreen. It may slide from the top edge of the windscreen or from the bottom edge of the windscreen.

The extending rollbars disclosing EP-A-1186483 may be adapted for use in the present invention. In order to be used in the present invention, they must be configured so that they extend between structures of the vehicle in the extended position.

The first and second parts may be mounted adjacent the top of the windscreen in the first position or adjacent the bottom of the windscreen of the first position. They may be configured to move to any point to reach the second position. For example, they may be configured to move to respective corners of the windscreen, for example corners opposite to the corner at which the respective parts are located in the first position.

Preferably, the strengthening member comprises a plurality of strengthening member units articulated together and which are moved by a combination of any of rotation, extension, or sliding. In this way, a strengthening pattern can be provided comprising a number of strengthening member units extending over the area of the front windscreen.

Preferably, an engagement member is provided for fixing the strengthening member in position in the second position.

For example, the strengthening member may be configured to move from the first position so that it engages a fixed engagement member and is held in position by the engagement member when in the second position. A locking member which is integral with the strengthening member may be provided, for example being in the form of a toggle lock.

The strengthening member itself is suitably of a shape such that, when in the second position, it does not substantially obstruct the vision of the driver. Preferably, the strengthening member is configured so that, in the second position, it is still possible for the driver to see through at least part of the lower half of the windscreen. This is the part of the windscreen through which the driver normally looks when in the driving seat and it is important that it should be possible to see through it even when the strengthening member has been extended, in the case of an accident.

It is preferable that the strengthening member is dimensioned so that it will not prevent the driver seeing an object which is at least two meters from the windscreen, when the driver uses binocular vision and without requiring the driver to move the driver's head. A balance will be sought between the need to provide a strengthening member which is sufficiently large to be strong with the desire to minimize obstruction of the field of vision. Suitably, the strengthening member will have a width as seen by the driver of less than 5 cm. This can be achieved where a plurality of strengthening members or strengthening member units are provided which together form a protection adjacent the front windscreen.

In a preferred embodiment, the strengthening member may be configured so that it is attached to a web of material which the driver can see, the web of material being drawn across at least part of the front windscreen when the strengthening member is extended to the second position. This web can be provided in order to catch debris, for example broken glass which can be very hazardous. It may be formed of a mesh or of a transparent or semi-transparent material, so that it does not obstruct the vision of the driver excessively. It may be made of any suitable material, for example a carbon fiber or KEVLARr™ mesh.

In one embodiment of the invention, a strengthening member is provided which is movable between a first position stored in the front of the vehicle windscreen and substantially not visible to the driver and a second position in which it extends adjacent to and in front of the vehicle windscreen. This can be used in combination with a system for raising the bonnet at the same time as the strengthening member is moved from the first position to the second position. The raised bonnet can provide a cushioning effect. The distance by which the bonnet raises may be controlled so that it does not obscure the vision of the driver excessively. If the bonnet is raised in this fashion, it is suitably pivoted at the front and raised at the rear, so that wind resistance does not cause it to tear. The bonnet may be constructed in a conventional way or it may be provided with additional strengthening. It may be ribbed for additional strength. Alternatively, it may be perforated so that it is partly transparent to further reduce impact on the visual field of the driver. It may partly or completely be constructed of transparent material.

The inventor has realized that the increased stiffness provided to the vehicle frame can be used to provide a mounting for an aerofoil extending to the rear of the vehicle. This aerofoil may be integral with the bumper structure of the vehicle. Preferably, the aerofoil is constructed so that air can flow over its top and bottom surfaces in such a way as to generate down force on the rear of the vehicle. This can be valuable when increased road holding is required. For example, this may be required when negotiating tight bends or when braking sharply.

However, an aerofoil constructed in this way can lead to increased air resistance. Accordingly, it is further preferred that closing means be provided which can be used to selectively close the airflow over the top surface of the aerofoil. For example, a shutter may be provided which has a first position in which it does not interfere with airflow over the top of the aerofoil and a second position in which it closes the airflow over the top surface of the aerofoil. Suitably, the shutter in the second position touches the leading edge of the aerofoil, to provide a smooth transition with minimal air resistance. The shutter may slide or rotate into position.

To optimize stability during avoidance maneuvers or cornering, the shutter may be split along the centre line of the vehicle, the split sections being operable independently to the left and right of the line. The split aerofoil may be selectively operable in a cornering mode, in which one is operated differentially with respect to the other, or in a braking mode, in which both sides are operated together. Thus, a down force can be applied on the inside wheels in curves or to equalize the load on both side wheels when braking.

The closing means may be operated by any one of:
A driver operated mechanism
An automatic mechanism. The automatic mechanism may respond to motion sensors which detect the motion of the car (rapid turning, rapid braking), sensors for sensing application of the brake pedal, sudden movements of the steering wheel etc.

This structure is considered to be inventive in its own right and the present invention accordingly further provides a vehicle comprising a rear bumper extending from the rear of the vehicle, the rear bumper being configured as an aerofoil having a top surface and a lower surface, the aerofoil being mounted so that, in at least one position, air can pass over the top surface.

In this aspect of the invention, shutter means are preferably provided for preventing airflow over the top surface.

The first, second and third aspects of the invention may be combined in a vehicle. A vehicle may comprise a strengthening member as defined for the first or second aspect of the invention, as well as a structure according to the second aspect of the invention.

The present invention will be further described with reference to the accompanying drawings in which:

FIG. 1 shows a sketch isometric view of the strengthening member according to the first aspect of the present invention.

FIG. 2 shows the strengthening member of FIG. 1 mounted in a vehicle.

FIG. 3 shows how the strengthening member of the invention can be used to protect the windscreen against collision with large mammals.

FIGS. 4-7 show front or rear views of windscreens including various different embodiments of the strengthening member according to the present invention.

FIG. 8 shows the strengthening member of FIG. 1 constructed in three parts.

FIGS. 9-14 shows schematic cross sections of a number of different types of vehicle incorporating strengthening members according to the present invention and optional internal additional strengthening members.

FIG. 15 shows the effect of the strengthening member of the present invention on the field of vision of the driver.

FIGS. 16-21 show different embodiments of strengthening member placed adjacent a windscreen.

FIG. 22 is a sketch isometric view of a further embodiment of strengthening member for placing adjacent the windscreen, which is also according to the third aspect of the invention.

FIG. 23 shows the effect of the visual field of the driver of the strengthening member of FIG. 22.

FIGS. 24-25 show embodiments of the vehicle incorporating strengthening members of the present invention.

FIGS. 26a and 26b show the relationship of the strengthening member of FIG. 22 and new designs of a-pillar in a vehicle.

FIGS. 27 and 28 show further embodiments of vehicle, incorporating a rear mounted aerofoil defining a bumper.

FIGS. 29A-29C show the movement a strengthening member according to the second aspect of the invention from a first position to a second position according to the invention.

FIG. 30 shows a schematic part cross sectional view showing further reinforcing members which may be incorporated in a vehicle.

FIGS. 31-34 shows steps in the movement of a reinforcing member from a first position to a second position according to the invention.

FIGS. 35-37 show an embodiment of a reinforcing member incorporated in the bonnet of a vehicle.

FIGS. 38A-38C show steps in the movement of another embodiment of strengthening member according to the invention from a first position to a second position.

FIG. 39 shows a further embodiment of a strengthening member.

FIGS. 40A-40C, 41A-41C, 42A-42C, 43A-43C, 44A-44C 45A-45C, 46A-46C, 47A-47C, 48A-48C, 49A-49C, 50A-50C, 51A-51C, 52A-52C, 53A-53C and 54A-54C show steps in the movement of various embodiments of strengthening member according to the invention from a first position to a second position.

FIGS. 55-60 show various embodiments of strengthening member according to the second aspect of the invention.

FIGS. 61 and 62 show further embodiments of pivoting strengthening member according to the second aspect of the invention.

FIGS. 63-74 show various embodiments of strengthening member according to the first aspect of the invention, mounted in a racing car.

BRIEF DESCRIPTION OF THE DRAWINGS

In FIG. 1, the different part 2,3 and 6 are shown connected together. They may be connected together by a suitable means.

Further, each of the strengthening member 2, 3 and 6 will be fixed firmly in use onto structural parts of the vehicle, including the section of the front structure adjacent to the dashboard, the top frame on the front window, the top frame of the rear window and the part of the rear structure adjacent to the rear window. They may be fixed using adhesive.

Figure 3:
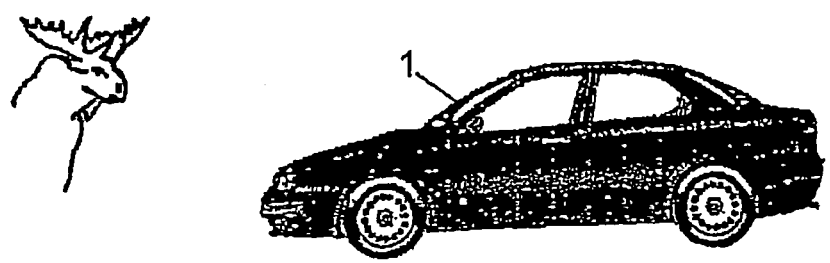

FIG. 3 shows how the strengthening member 1 can provide additional protection in cases of collision with large objects. A collision, even at normal speeds, with an object which is high or large enough to impact the windscreen can result in severe damage to the vehicle and danger to the passengers. For example, the entire roof section may be torn from the vehicle. This kind of hazard can be produced in forested or isolated areas for example, by a large mammal, in the case of FIG. 3, a moose. It can be seen that in a collision, the animal would contact the windscreen but damage to the vehicle and hazard to the passengers will be minimized by the additional strength given to the windscreen by the strengthening member.

Figure 1:
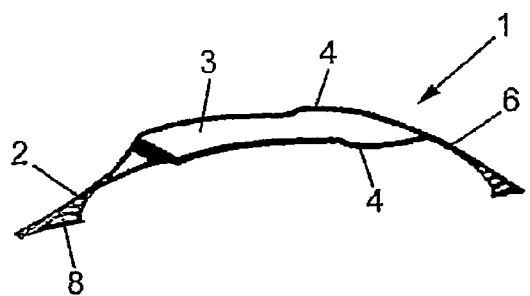
FIGS. 1 and 2 show a first embodiment of strengthening member and a vehicle comprising the strengthening member according to the present invention mounted inside the passenger compartment. A strengthening structure 1 comprises a strengthening member 2 according to the invention which, when assembled, extends adjacent the front windscreen 103 of the vehicle. The strengthening member 2 is connected to a second strengthening member which comprises a pair of ribs 4 which are substantially parallel to one another and which are placed inside and contacting the roof structure 5 of the vehicle. The two ribs 4 come together at a point where they contact a third strengthening member 6 which in use contacts the rear window 7 of the vehicle. The vehicle shown in FIG. 2 is accordingly provided with additional support for each of the windscreen 103, roof structure 5 and rear windscreen 7. The support is located between the edges of the structures and directly in contact with them, on the inside whereby considerable support can be obtained. It can be seen that the strengthening member 2 comprises a number of webs with lightening holes, for example 8 as shown in first section 2 in FIG. 1, to make the structure light and to minimize impact on the driver's field of view. However, with correct design as is well known in the art of the design of girders, beams and other strengthening members, this may have no substantial effect upon the strength of the design.
Figure 2:
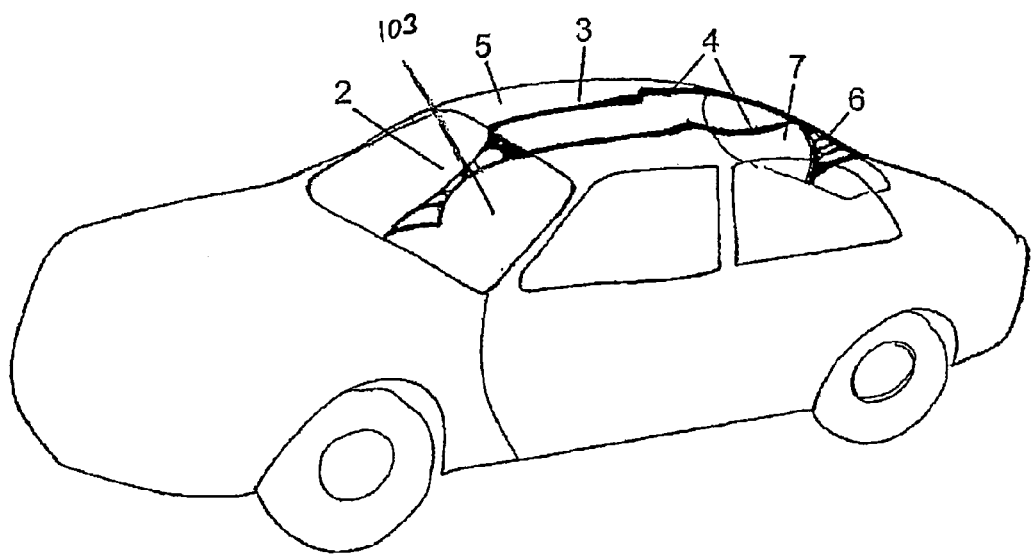
Figure 4:
Figure 5:
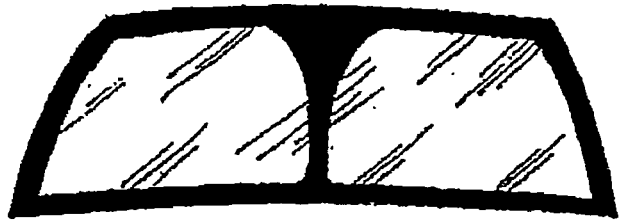

FIGS. 4-7 show various embodiments of strengthening member 1. FIG. 4 shows a strengthening member which is substantially the same as shown in FIG. 1. FIG. 5 shows a similar structure but the upper part of the Y is solid, rather than comprising two separate arms.

Figure 6:

It is not necessary to have two separate arms if the main part of the strengthening member 2 is sufficiently strong, and a single rib 108 may be used as shown in FIG. 6.

Figure 7:
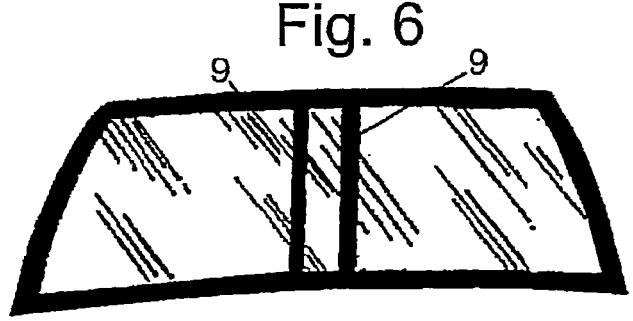

Alternatively, a pair of substantially parallel ribs 9 may be used as shown in FIG. 7. Similar structures may be adopted for the third section 6.

The whole windscreen frame can be manufactured all in one piece from any composite material. The integral structure may comprise any or all of the strengthening member, a pillars and Instrument Panel-beam (IP-beam). The instrument panel and dashboard can thus be integrated only requiring padded interior finish to comply with cushioning shock-absorption directives or feasible design finish preferences.

Such one piece production is considered feasible for a balanced blend of composite materials, as a one piece design may facilitate integrity of strength, and be cost efficient with economy of scale aspects saving assembly time, material consumption and logistics.

Figure 8:
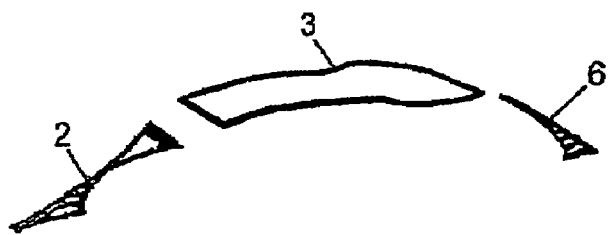

FIG. 8 shows a strengthening structure substantially as shown in FIG. 1 but in which the strengthening members 2, 3 and 6 are constructed separately and subsequently joined together. They may be joined by any suitable means, for example mechanical connections such as bolts, fitted joints or by adhesive or by welding.

FIGS. 9-14 show how different embodiments of the strengthening member of the invention may be provided for various different types of vehicle.

Each of the drawings in FIGS. 10-14 also show optional additional strengthening members extending from the chassis of the vehicle to the roof structure for additional crush resistance.

Figure 9:
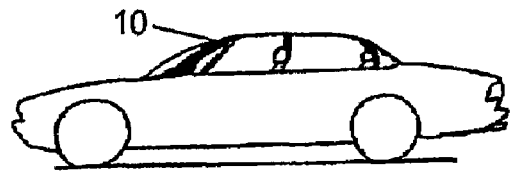
Figure 10:
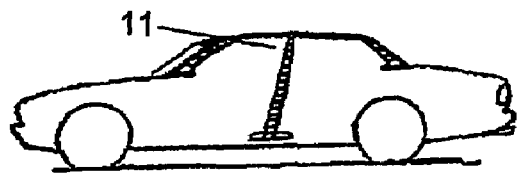
Figure 11:
Figure 12:
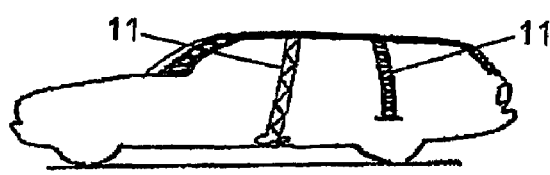
Figure 13:
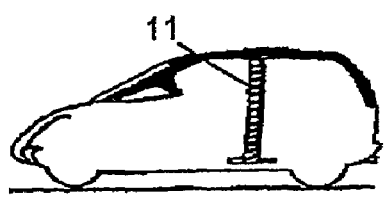
Figure 14:
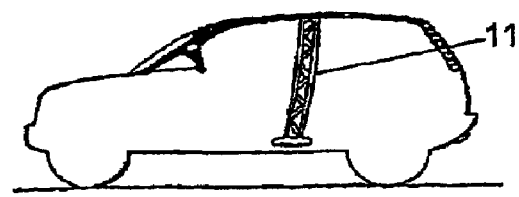

FIG. 9 shows a soft-top vehicle in which there is only a strengthening member 10,adjacent the windscreen. All the other vehicles shown in FIGS. 10-14 have hard tops and each comprises a strengthening structure 11 which extends continuously from the front structure to the rear structure, providing support for all of the front windscreen, roof structure and rear windscreen.

Figure 15:
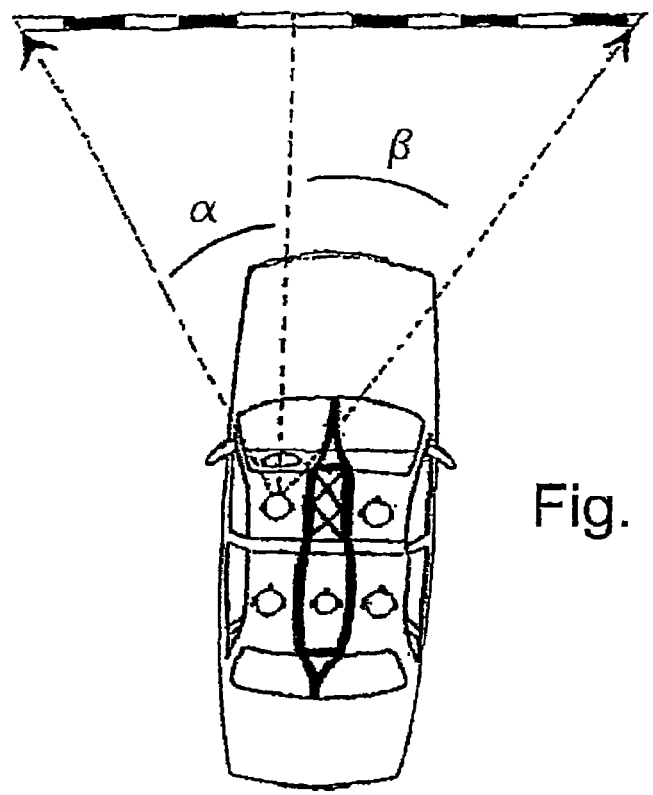

FIG. 15 shows the field of view of a driver in a vehicle fitted with a strengthening member according to the present invention. The vehicle shown is a left hand drive type of vehicle. It can be seen that the field of view is still very wide to the driver's right. In fact, the angle of the driver, $\alpha$, which is restricted in practice by the a-pillar of the vehicle is smaller than the angle $\beta$.

Figure 16:
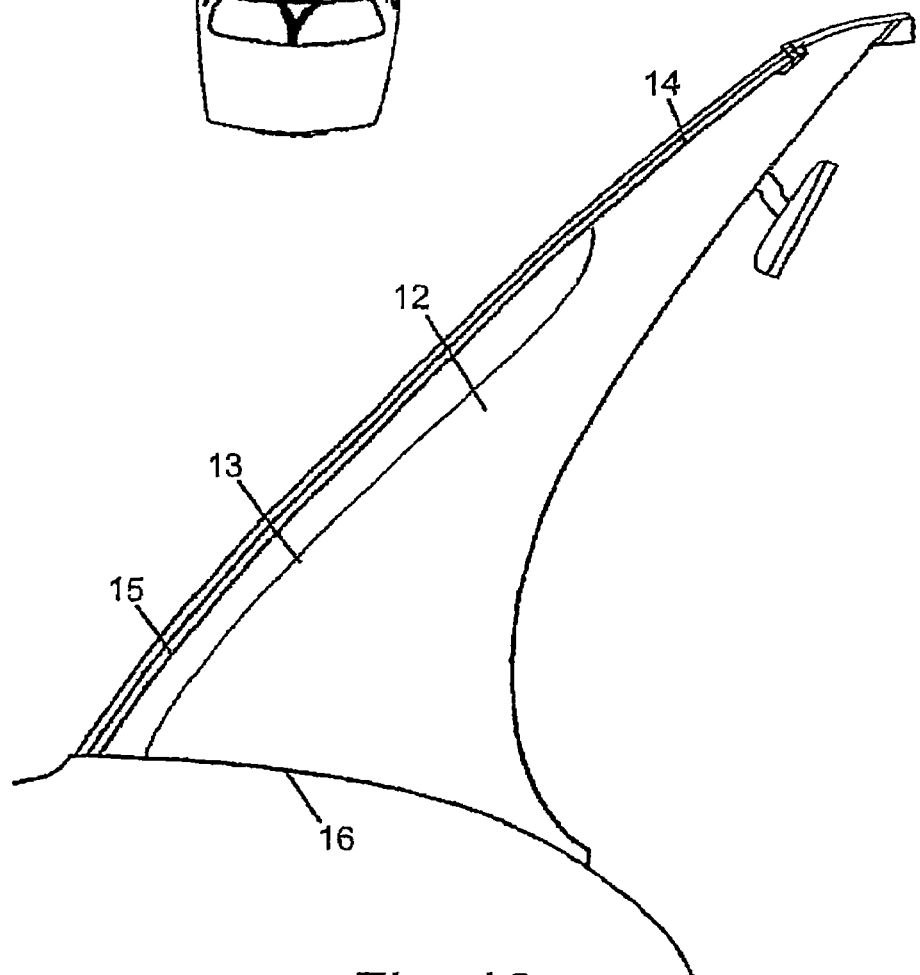

In FIG. 16, the strengthening member 12 comprises a solid filament of transparent material. It can be seen that, along its front edge 13, it does not abut the windscreen 15 directly. It abuts the windscreen 15 in the section 14, at the top providing direct support for the windscreen. In practice, it is preferably adhered to the windscreen using conventional high strength adhesive. The lower edge 16 it is fixed to the structure underlying the dashboard.

Figure 17:
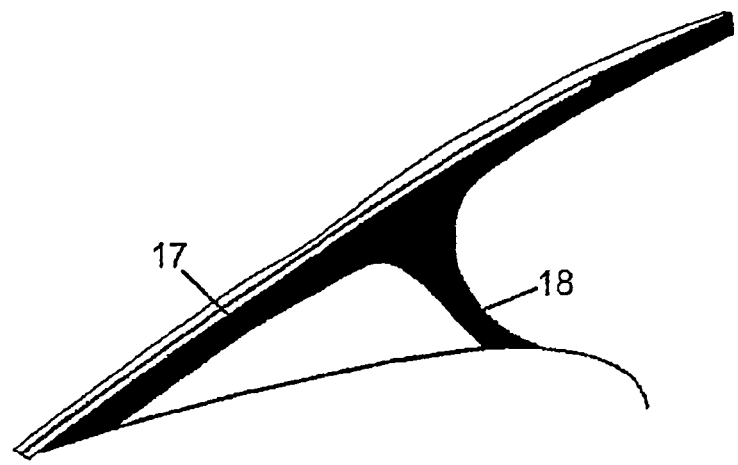

FIG. 17 shows a different embodiment of the strengthening member 17 which comprises an additional strut 18 which projects rearwardly and contacts the dashboard.

Figure 18:
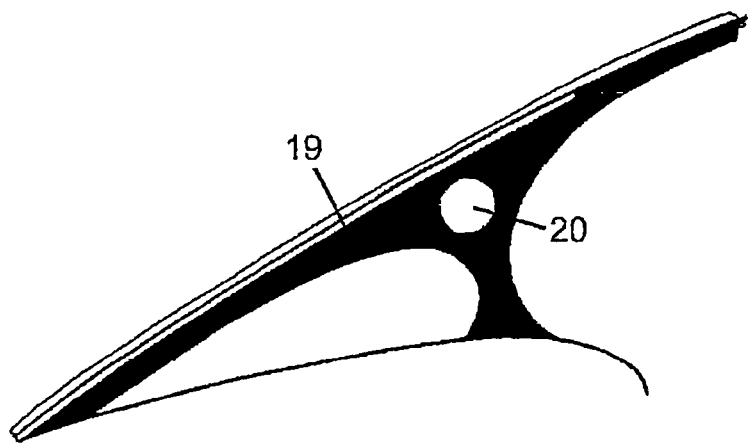

FIG. 18 shows similar design of strengthening member 19 which comprises a lightening hole 20 in a position in which it will not substantially reduce the strength of the structure.

Figure 19:
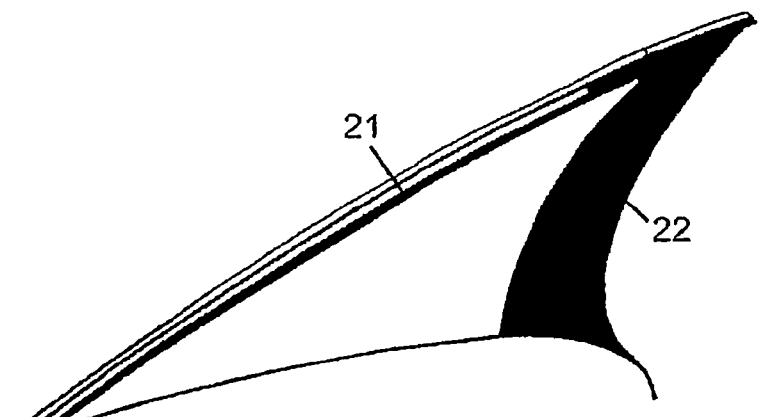

FIG. 19 shows a different design in which a thin filament 21 underlies the top part windscreen, providing support, whilst a substantially vertical section 22 extends upwardly towards the roof providing strong additional support for the roof against rollover roof crush.

Figures 20, 21:
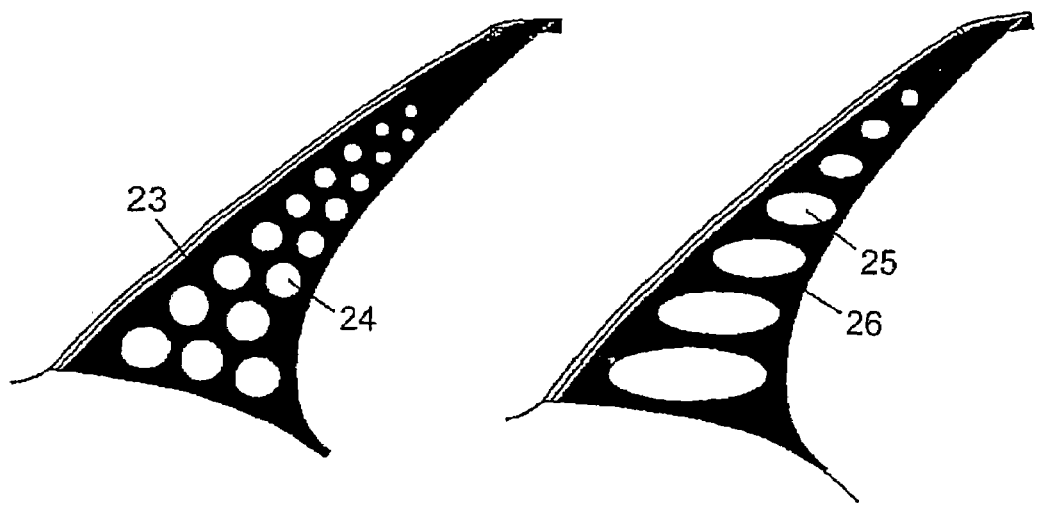

FIG. 20 shows an embodiment in which a solid structure 23 is provided with a plurality of lightening holes 24. FIG. 21 shows a different embodiment 26 in which the lightening holes 25 are of a different shape.

Figure 22:
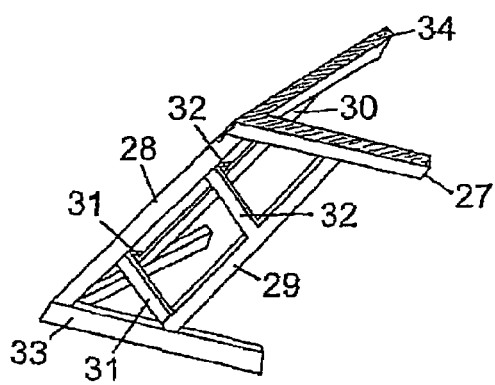

FIG. 22 is sketch isometric view of a particularly preferred embodiment of strengthening member 27 for use adjacent to the front windscreen of a vehicle.

It is also an embodiment of a strengthening member according to the third aspect of the invention.

It comprises a first longitudinally extending member 28 which is swept back at an angle corresponding to the angle of the windscreen of the vehicle to which it is to fitted. There is a pair of second longitudinally extending units 29 and 30, which are swept back at the same or substantially the same angle as the first member 28. They are joined to the first member by struts 31 at the bottom and 32 near the top. The struts 31 and 32 are not horizontal, to minimize visual intrusion. The longitudinally extending members 28, 29 and 30 join a pair of a v-shaped mounting members 34 and 33 which are for engaging the structure of the vehicle above the windscreen (or the top of the windscreen) and the structure of the vehicle below the windscreen respectively. The top of the v-shaped member 34 is shown hatched to indicate an area where adhesive 35 may be applied to form a bond with the top structure of the vehicle. Alternatively, mechanical connections such as screws and bolts may be used. Similar connecting means may be used in the lower v-shaped part 33.

Members 28, 29 and 30 have more than 65 mm open space between them. Members 28, 29 and 30 are narrower than 65 mm, preferably narrower than 55 mm or 50 mm in the horizontal plane when seen from the drivers' position, and more preferably less than 40 mm. The struts 31 and 32 at their narrowest are narrower than 65 mm and preferably narrower than 50 mm.

This lattice design can be cut and folded from one sheet of material into the final shape. Laser-cutting, hydro-forming, welding if required, or any manufacturing technique may be used.

Honeycomb sandwich structure composite materials of any nature may be used depending on strength/cost requirements (Steel/titanium/KEVLAR™/plexi/reinforced polyamide 66/Glassfibre-reinforced PP, or any new alloy).

Figure 23:
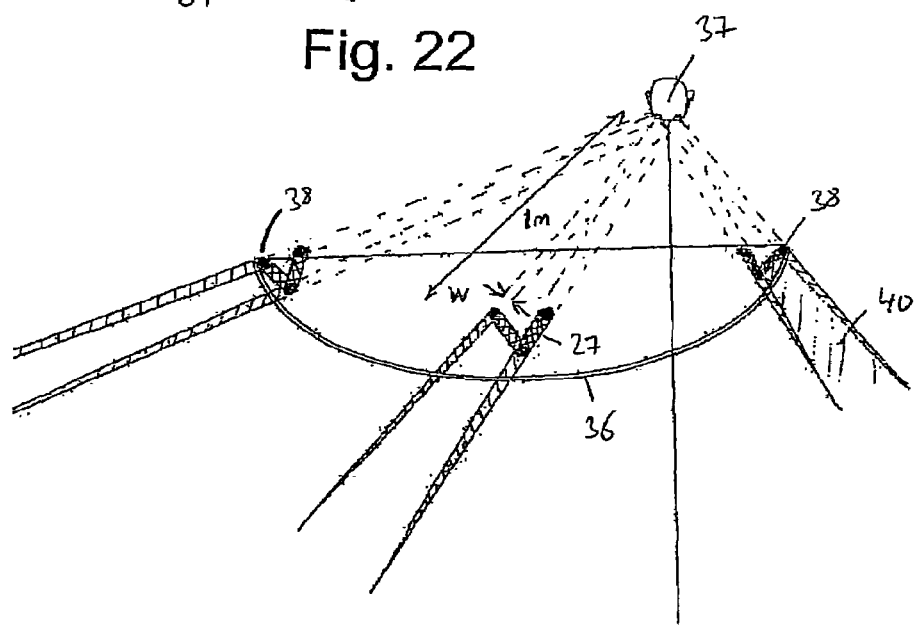

The width of each of the longitudinally extending members 28,29 and 30 and the struts 32, 31 presented to the driver does not exceed more than 50% of the minimum normal eye spacing of drivers, being not less than about 3 cm. All of the members are tilted so that they do not form an obstruction to seeing horizontally extending objects. Many objects on the road are either generally vertically extending, such as cyclists, the sides of vehicles, roadside furniture, or horizontally extending for example the super structure of many vehicles. FIG. 23 shows how the obstruction of the driver's field of view is minimized by the structure of FIG. 22.

The structure 27 is located adjacent to the front windscreen 36 located approximately 1 m from the driver 37. The width W of the longitudinally extending numbers of the structure 27 presented to the driver are less than 3 cm, so that the area (shown cross hatched) which is not visible to either eye of the driver 37 is minimized. It can be seen that the area which is not visible to the driver extends for a distance of approximately 1 m from the structure. As this distance is less than the normal distance to the front bumper of the vehicle, it is clear that no object which is on the road will be obscured.

FIG. 23 also shows that the a-pillar 38 may be constructed using a similar structure to that shown in FIG. 22 so that the obstruction of vision by the a-pillar is minimized as well Each a-pillar 38 is most preferably constructed so that it comprises a first longitudinally extending member which is swept back at an angle corresponding to the angle of the windscreen of the vehicle to which it is to be fitted. There may be one or two second longitudinally extending units which are swept back at the same or substantially the same angle as the first member 28. They are joined to the first member by struts at the bottom and near the top. The struts are not horizontal.

The longitudinally extending members have more than 65 mm open space between them. The longitudinally extending members are narrower than 65 mm, preferably narrower than 50 mm in the horizontal plane width when seen from the drivers' position, or more preferably less than 40 mm.

As for the strengthening member 27, the a-pillar can be cut and folded from one sheet of material into the final shape. Laser-cutting, hydro-forming, welding if required, or any manufacturing technique may be used.

The whole area of the drivers field of vision subtended by the a-pillar 38 is shown in FIG. 23. It can be seen that this comprises a central area, lightly hatched, 40 which in practice will be visible to the driver using the design according to FIG. 22. This area would not be visible using a conventional design of a-pillar. The area, deeply hatched, not visible is clearly very small and does not extend for a significant distance beyond the a-pillar.

As can be seen in FIG. 23, the relative positions of linearly extending structural units of each of the a-pillars and the strengthening member are adjusted so that at least two line up in the filed of vision to thereby minimize obstruction of the field of view of the driver. As a result, the arrangement is not symmetrical.

The structural units of the strengthening member 27 and the a-pillars 38 are aligned asymmetrically with respect to the centre line of the vehicle, so that they align with the driver's filed of vision to minimize visual impact The windscreen 36 is made so wide as to be directly adjacent to the side-windows of the doors, when seen from the exterior (wider than most standard cars made in 2005).

Member 38 on the right side of the vehicle, and member 38 on the left side of the vehicle are each bonded to the windscreen which leaves member 27 with some space to the windscreen in order to benefit from the laminated windscreens inherent shock cushioning properties in the event of collisions for example, with pedestrians.

In the a-pillars 38, one or two of the longitudinally extending members are bonded to the windscreen, the others being spaced from it to provide a shock absorbing capacity.

FIG. 24 shows a schematic side view of a vehicle comprising a plurality of strengthening members. There is a strengthening member 41 according to the present invention adjacent the windscreen and an additional strengthening member 42 adjacent the roof.

The a-pillar 43 is constructed with spaces in it, shown in FIG. 22 to enhance the view forward and to the side as described above. The b-pillars 44, c-pillars 45 and the rear structure 46 are formed in a conventional manner. However, the inventor has realized that all of these structures may be made of light material with spaces in the structure to enhance the view all round as shown in FIG. 25. Here there is a strengthening member 47 according to the invention adjacent to the front windscreen, a strengthening member 48 adjacent the roof, a strengthening member 49 adjacent the rear windscreen and perforated structures 50, 51 and 52 defining the a-, b-, and c-pillars. This creates a very open "cage" through which the driver obtains a clear all round View.

FIGS. 26A and 26B show further views of a vehicle incorporating a strengthening member according to FIG. 22 and a-pillars constructed according to the same principles as the structure shown in FIG. 22.

Figure 27:
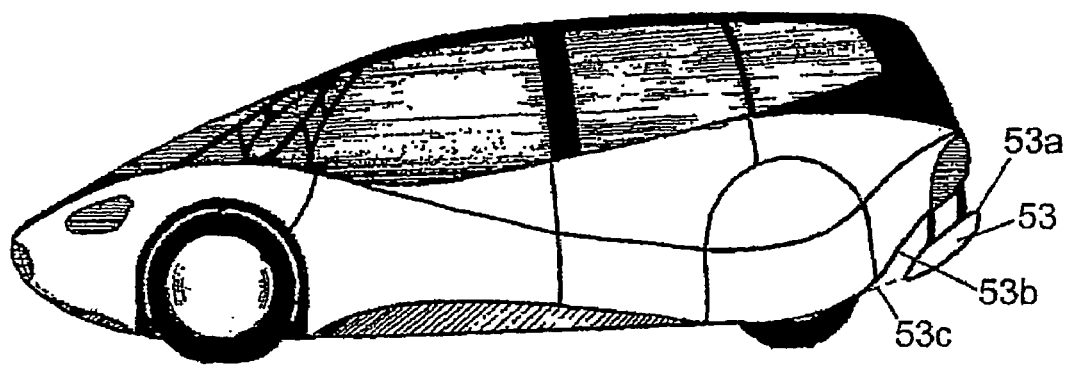
Figure 28:
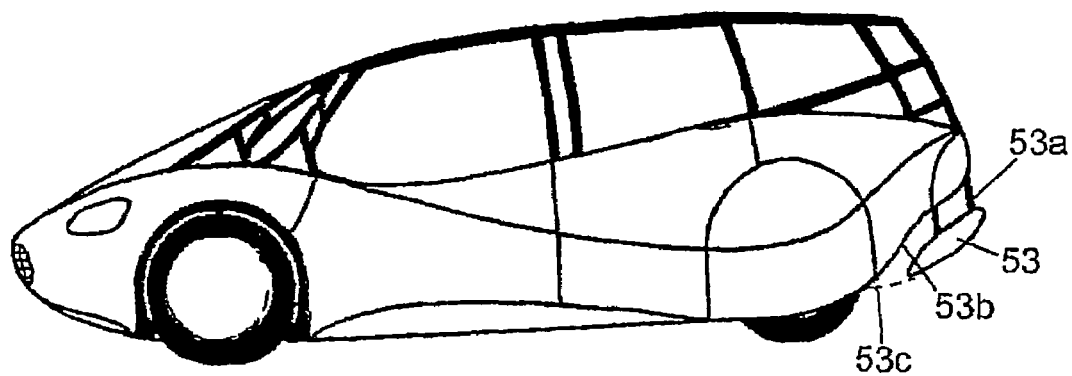

FIGS. 27 and 28 show views of vehicles corresponding to FIGS. 24-25 further incorporating a rear mounted aerofoil 53.

The rear mounted aerofoil 53 also defines the rear bumper structure. Conventional materials for the rear bumper structure may be provided. However, an upper surface 53A of the rear mounted aerofoil is configured so that it is spaced from a surface 53B of the vehicle, to define an airflow passage. This airflow passage is configured so that air flowing under the vehicle is deflected over the top surface of the rear mounted aerofoil. The passage is configured so that a down force may be generated, for pushing the rear of the vehicle more firmly in contact with the road. This can be beneficial for steering and braking.

A dotted line 53C shows the extended position of a shutter. This shutter may have a first position (not shown) in which it is stored, for example behind the rear wheels of the vehicle, and a second position in which it extends across the opening to the airflow passage formed between the surfaces 53A and 53B. In this way, airflow over the top of the aerofoil can be prevented. This allows drag created by the aerofoil to be minimized in conditions where the additional down force on the rear of the vehicle is not required.

The shutter may be divided along the centre line of the vehicle into left and right portions. In a first mode, the left and right portions may be operated together to enhance breaking. In a second control mode, the left and right portions may be independently operable to enhance load on one side of the vehicle, on the inside of a curve during cornering, to improve road holding.

Figure 29A:
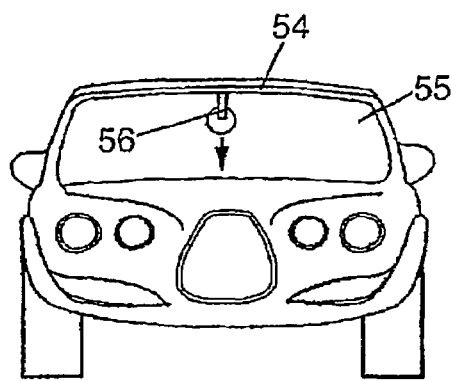
Figure 29B:
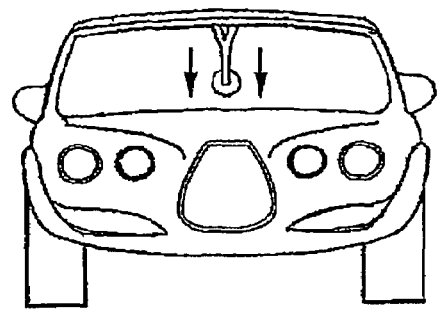
Figure 29C:
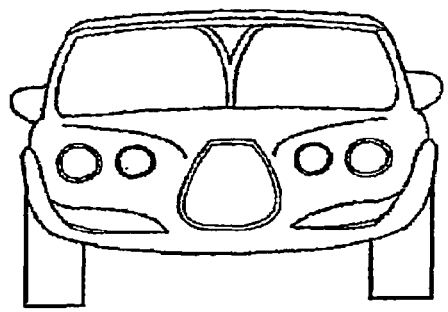

FIGS. 29A-29C show how a strengthening member according to the second aspect of the invention can be moved from a first, storage position adjacent the roof 54 of a vehicle, to a position inside the windscreen 55 of the vehicle when operating means for moving the movable strengthening member 56 are activated. Further details are provided in FIGS. 31-34, which show how the strengthening member 56 slides a long curved path from a storage position adjacent a strengthening member 57 which is adjacent the roof, to a second position in which it lies behind the windscreen 55 and extends between the front structure of the vehicle below the windscreen and the front structure of the vehicle above the windscreen, thereby providing a firmly anchored reinforcement behind the windscreen.

FIG. 29A and FIG. 29B can also be descriptive of a static strengthening member according to the first aspect of the invention where the central Alpha-pillar is not entirely connected all the way from the upper windscreen-frame to the lower windscreen-frame/dashboard/instrument-panel-pillar. The strengthening member can have structural and deflective safety properties while having an opening, or a partial opening, at some area in front of or below the typical position of the interior rear-view-mirror.

Figure 30:
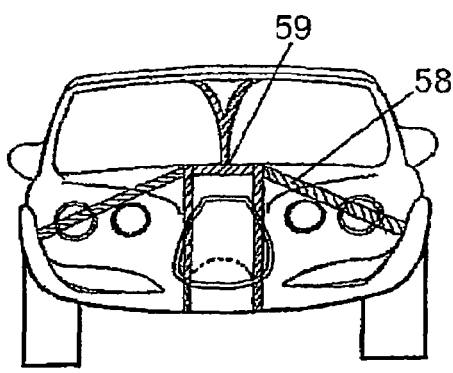
Figure 31:
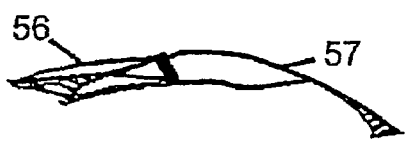
Figure 32:
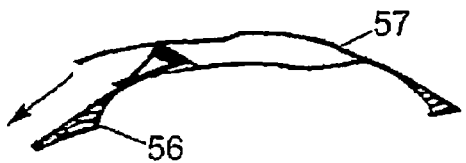
Figure 33:
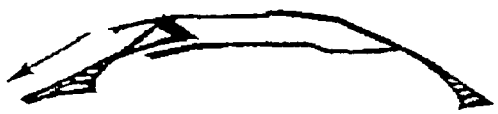
Figure 34:

FIG. 30 shows how an internal fixed engagement structure 58 can be provided which, in the second position engages the bottom of the strengthening member at the point 59 so that a strong resilient structure is provided. For example, the strengthening member may abut the engagement structure or lock into it.

Figure 35:
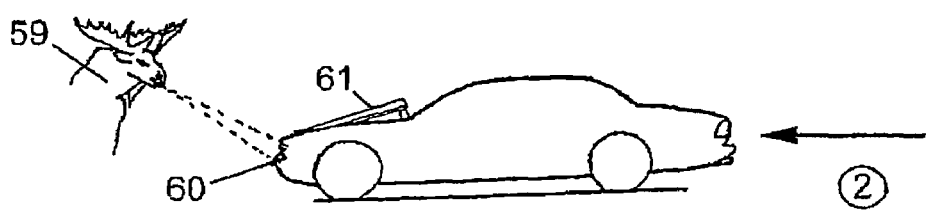
Figure 36:
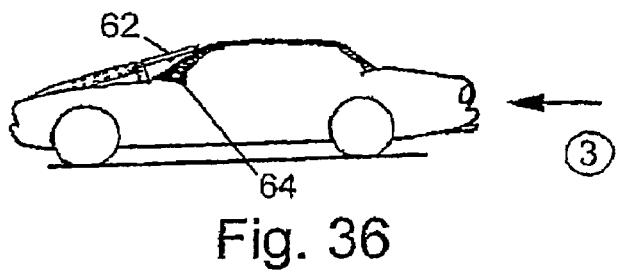
Figure 37:
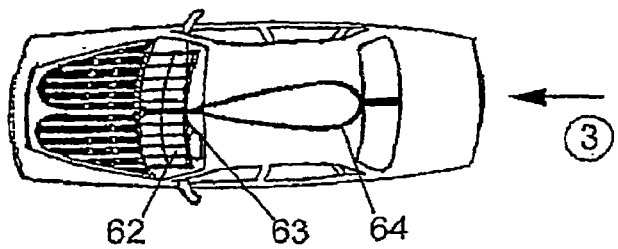

FIGS. 35-37 show an embodiment of the second aspect of the invention in which a large object such as a moose 59 is detected by a sensor 60 mounted in the vehicle, so that a moving means described below is actuated. The detection may be for example by short range radar or by a thermal detecting system which is configured to be able to identify the infrared emission of a mammal. The detector may be configured to distinguish the infrared emission of for example an exhaust pipe which is as a relatively high temperature from that of a mammal which is at normal body temperature.

When the object 59 is detected, the bonnet 61 of the car is raised to provide a deflecting structure. However, it is not raised so high that it will interfere with the line of vision of the driver. The windscreen still has to be protected. The windscreen is protected in this case by a further strengthening member 62 which is stored underneath the bonnet 61 in a storage position and which is moved by the moving means to the position shown in FIG. 36 when the object is detected.

The top view shown in FIG. 37 shows that the strengthening member 62 comprises a grid of longitudinal members which are parallel to the direction of motion of the car and horizontal members 63 which are transverse to the direction movement of the car. This forms a across the windscreen for protecting the whole of the windscreen from impact. A strengthening member 64 according to the first aspect of the invention and extending from the front of the vehicle to the rear of the vehicle is provided to provide a further support which the reinforcing member 62 can engage.

Figure 38A:
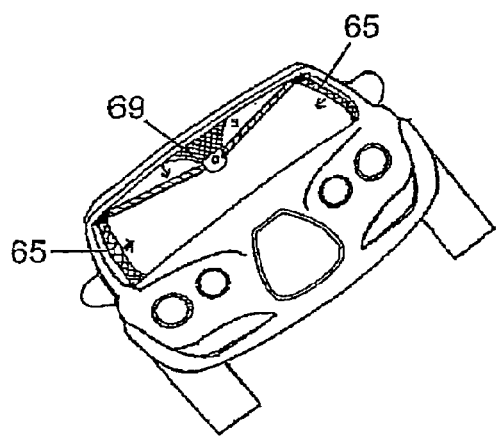
Figure 38B:
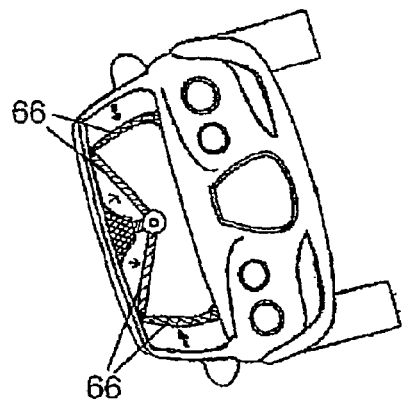
Figure 38C:
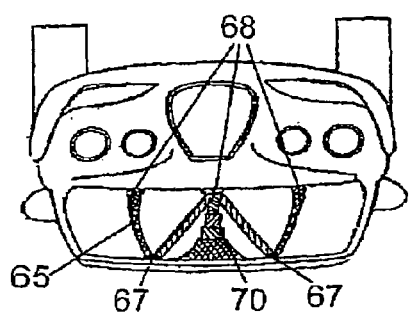

FIGS. 38A-38C show a further embodiment of strengthening member according to the second aspect of the invention. The vehicle is shown rolling from a critical position in FIG. 38A at which a sensor can detect that rollover is inevitable. When this condition is detected, operating means in the form of springs (not shown) are activated to move a strengthening member 65 comprising a plurality of strengthening member units 66 from a storage position in which the sections are stored adjacent the a pillars and the roof of the vehicle. FIG. 38 shows an intermediate position during the movement of the strengthening member units 66 and FIG. 38C shows the strengthening member in the final position.

Engagement members can be provided for example on the roof structure at the points 67 and on the structure in front of the windscreen at the points 68 which are configured so that they engage the strengthening member 65 when it is in the final position so that it will lock into position. There may be a simple arrangement whereby a part of the strengthening member moves into a position in which it physically engages the engagement member, movement of the strengthening member with respect to the engagement member in the direction of impact being prevented by simple obstruction.

It can be seen that the strengthening member shown in FIGS. 38A-C comprises a fixed structure 69 in which the telescopic central strengthening member unit 70 is stored. As this is at the top of the windscreen, it does not interfere with the normal vision of the driver.

Figure 39:
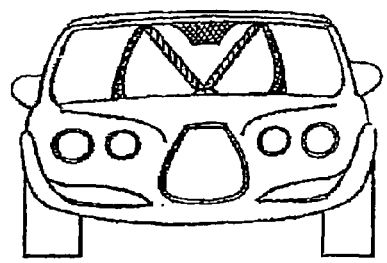

FIG. 39 shows a corresponding design, except that there is no central telescopic member unit 70.

FIGS. 40A-40C, 41A-41C, 42A-42C, 43A-43C, 44A-44C, 45A-45C, 46A-46C, 47A-47C, 48A-48C, 49A-49C, 50A-50C, 51A-51C, 52A-52C, 53A-53C, 54A-54C each show further embodiments of strengthening member according to the second aspect of the invention. In each case, the figure designated A shows the vehicle at an angle at which a sensor will detect that rollover is inevitable. At this point, operating means (not shown) which may be the form of a motor, spring loaded drive or any other suitable means, moves a strengthening member. In the position shown in the figure designated C, the strengthening member locks into position adjacent engaging members, which are not shown in detail, to provide a strong support.

Figure 40A:
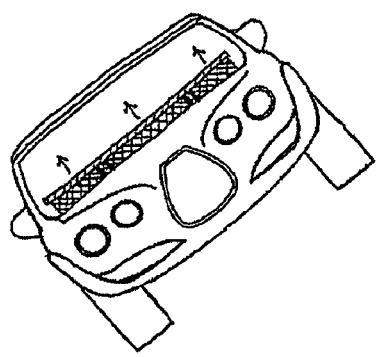
Figure 40B:
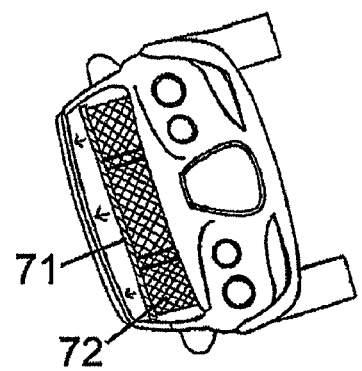
Figure 40C:
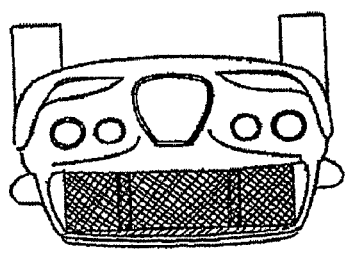

In FIG. 40C, the strengthening member comprises a rigid bar 71 which draws a flexible see-through mesh 72 across the front windscreen, through which the driver can see but which will arrest broken glass and other debris which might strike the driver.

Figure 41A:
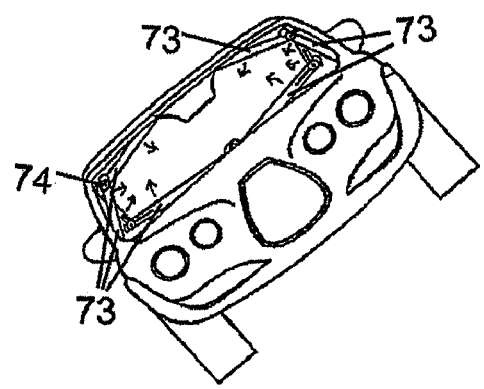
Figure 41B:
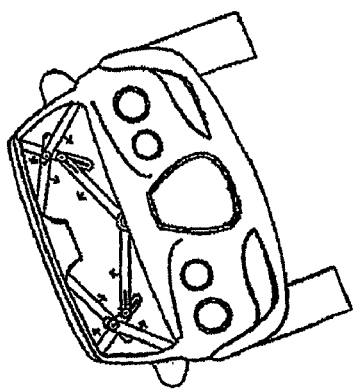
Figure 41C:
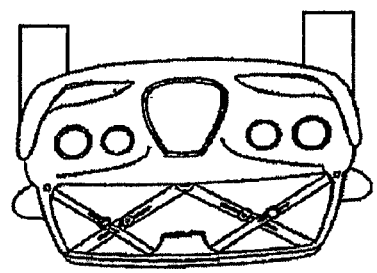

In FIG. 41C, the strengthening member is provided by strengthening member units which are in the form of articulated arms with sliding pivots 74 which move from a storage position adjacent the edges of the windscreen to a second position shown in FIG. 41C in which they lock into position behind the windscreen. The sliding pivots 74 may form a toggle lock so that the strengthening member 73 is held rigidly in the position shown FIG. 41C.

Figure 42A:
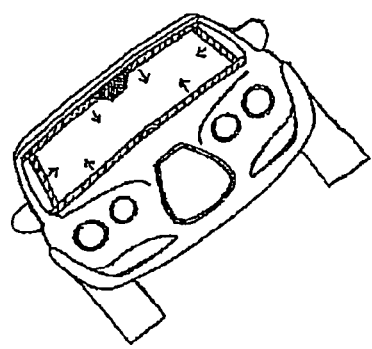
Figure 42B:
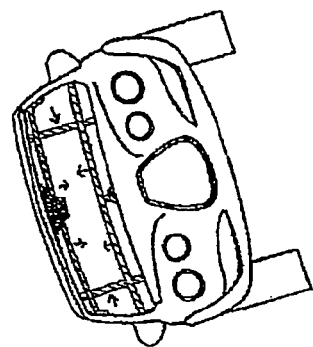
Figure 42C:
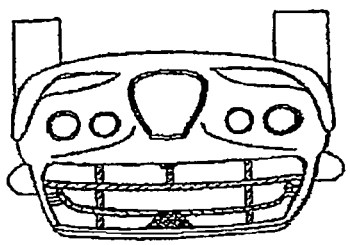
Figure 43A:
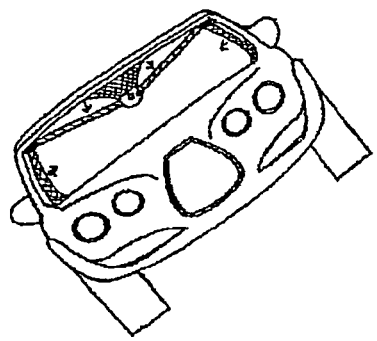
Figure 43B:
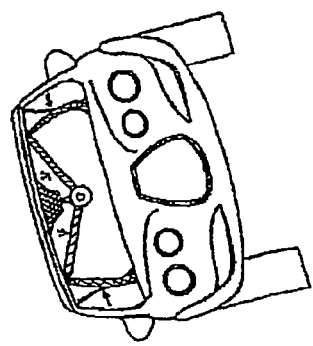
Figure 43C:
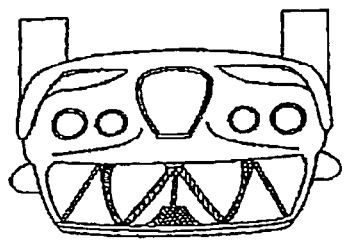
Figure 44A:
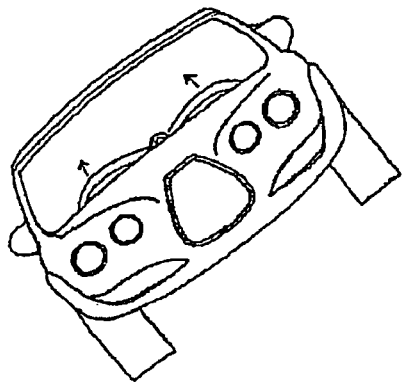
Figure 44B:
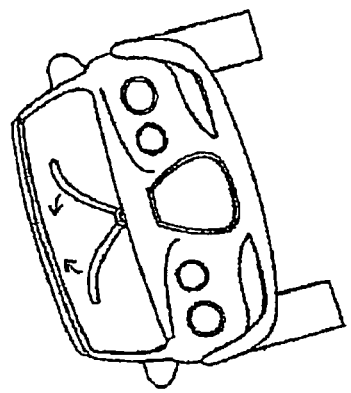
Figure 44C:
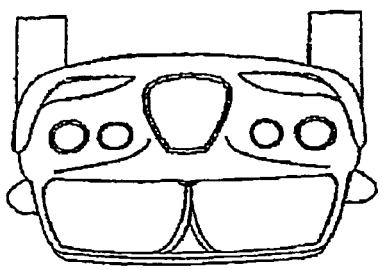
Figure 45A:
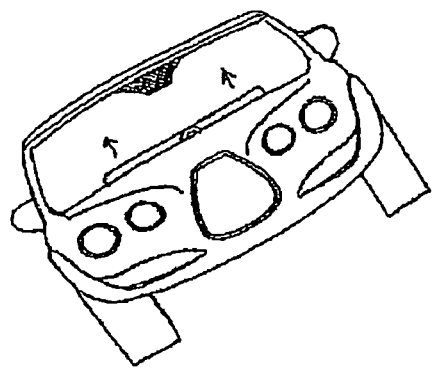
Figure 45B:
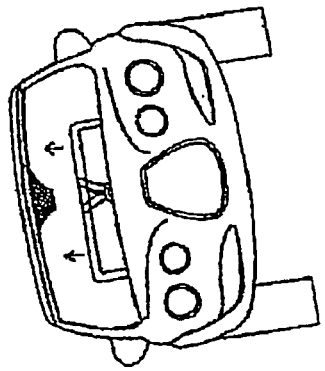
Figure 45C:
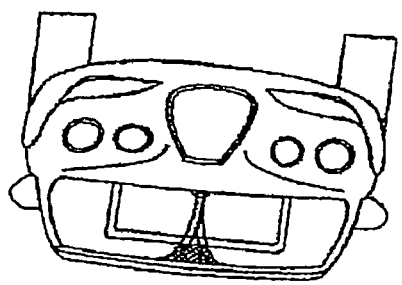
Figure 46A:
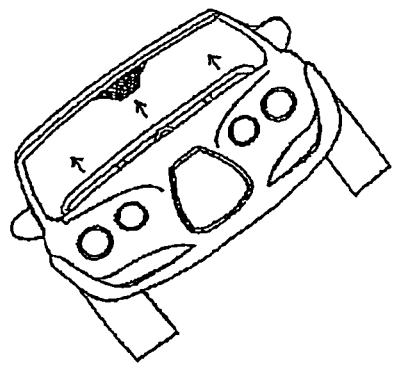
Figure 46B:
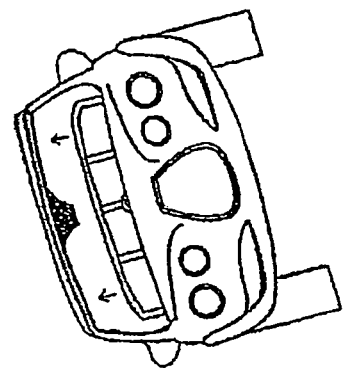
Figure 46C:
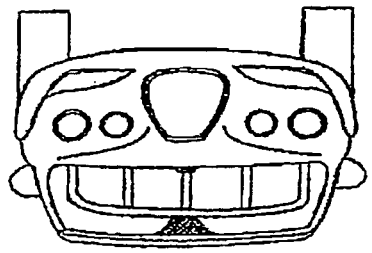
Figure 47A:
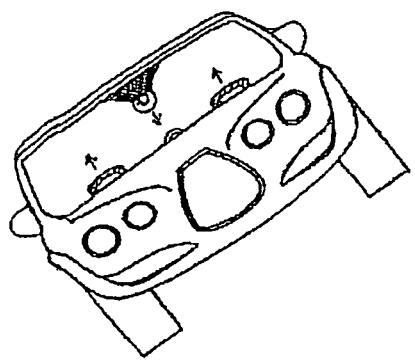
Figure 47B:
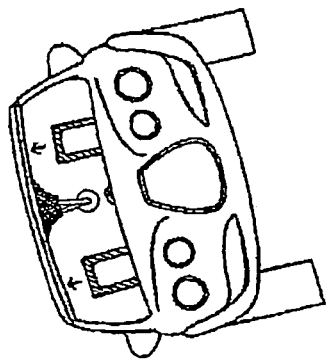
Figure 47C:
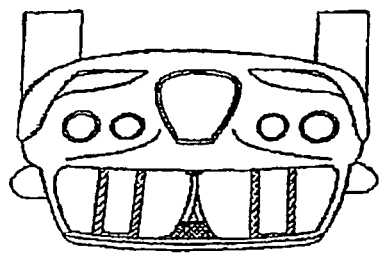
Figure 48A:
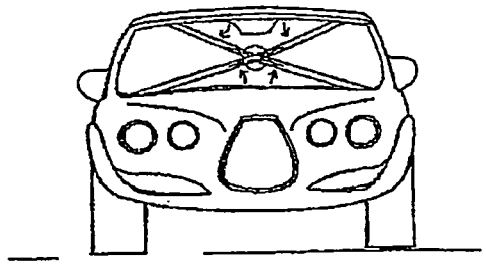
Figure 48B:
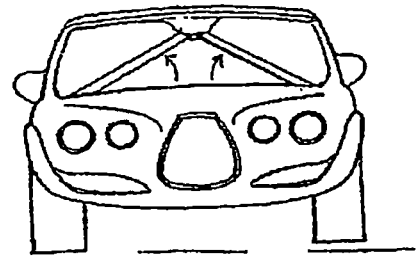
Figure 48C:
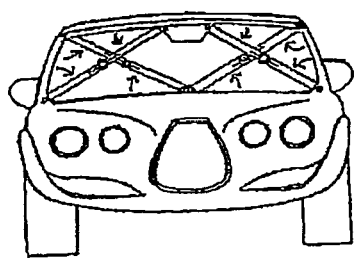
Figure 49A:
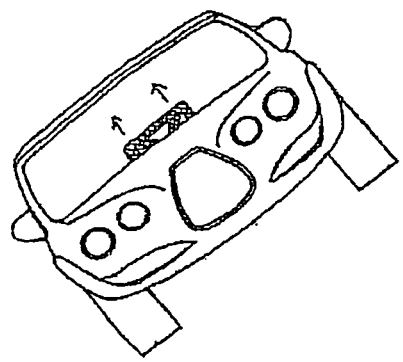
Figure 49B:
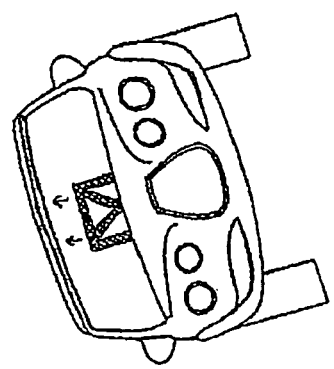
Figure 49C:
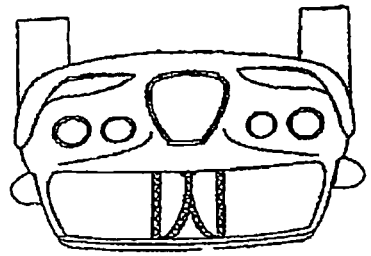
Figure 50A:
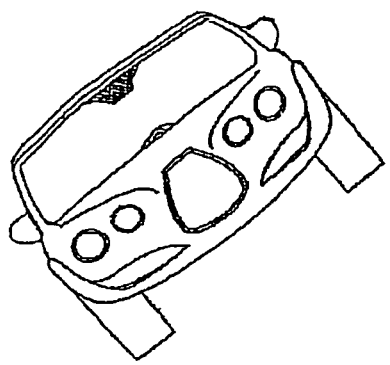
Figure 50B:
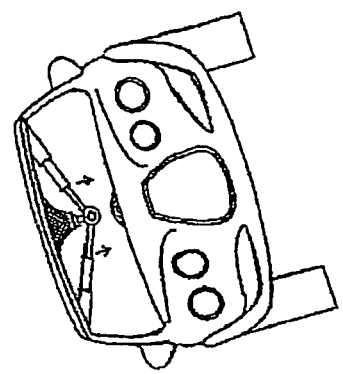
Figure 50C:
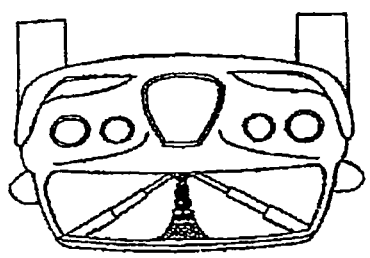
Figure 51A:
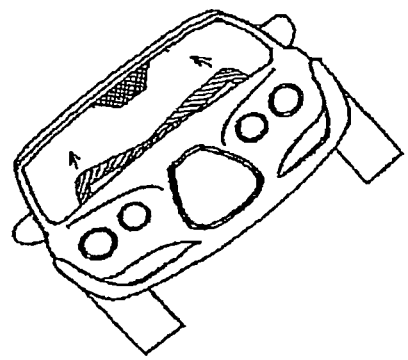
Figure 51B:
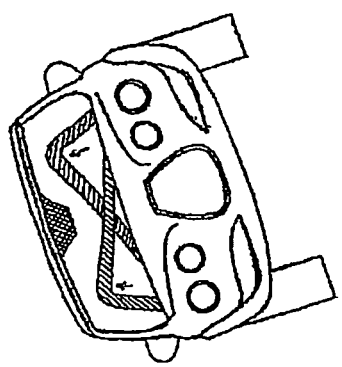
Figure 51C:
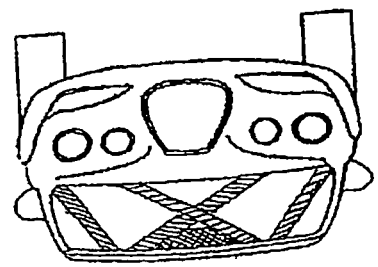
Figure 52A:
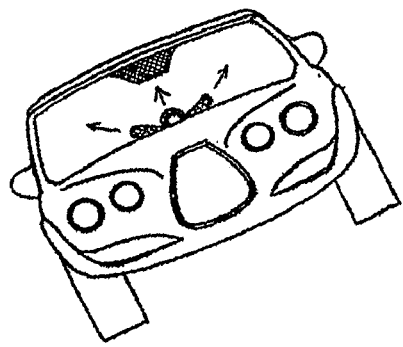
Figure 52B:
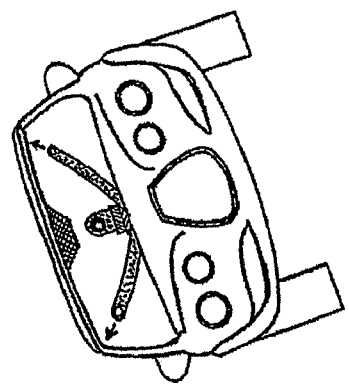
Figure 52C:
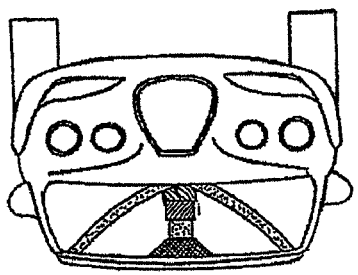
Figure 53A:
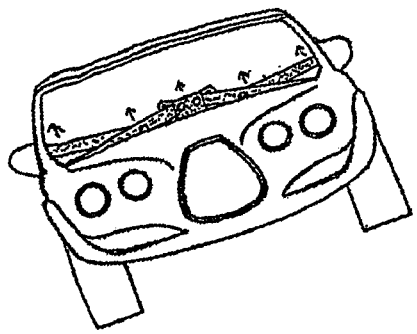
Figure 53B:
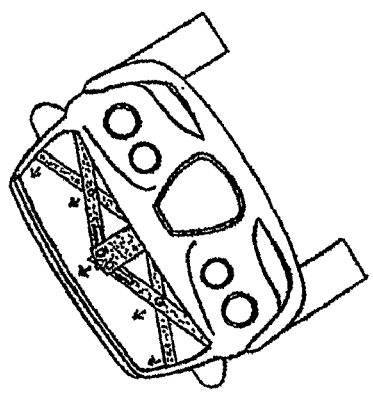
Figure 53C:
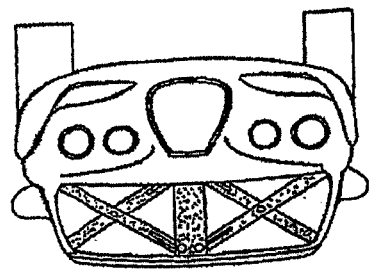
Figure 54A:
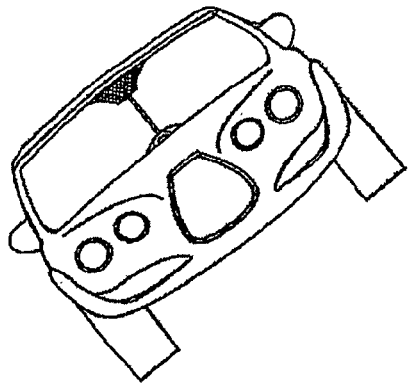
Figure 54B:
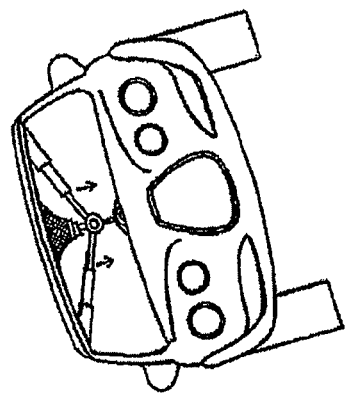
Figure 54C:
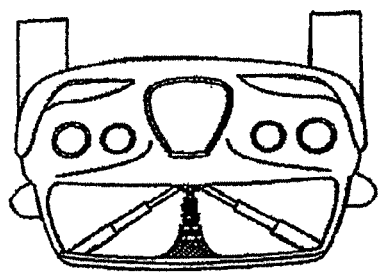

In FIG. 42C, it can be seen that the strengthening member comprises strengthening member units which slide from storage positions adjacent the screen to define a grid extending across parts of the screen, through which the driver can still see. Similarly, in FIG. 43C the strengthening member comprises a number of units which extend, slide or pivot into position. Similar comments apply to the remaining embodiments.

Figure 55:
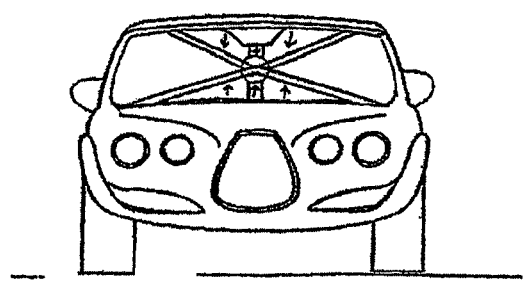
Figure 56:
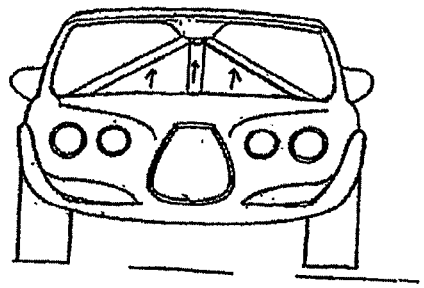
Figure 57:
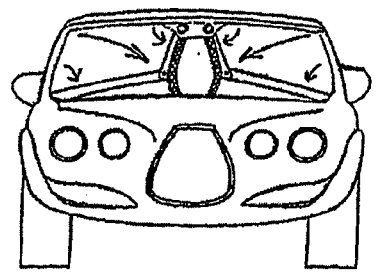
Figure 58:
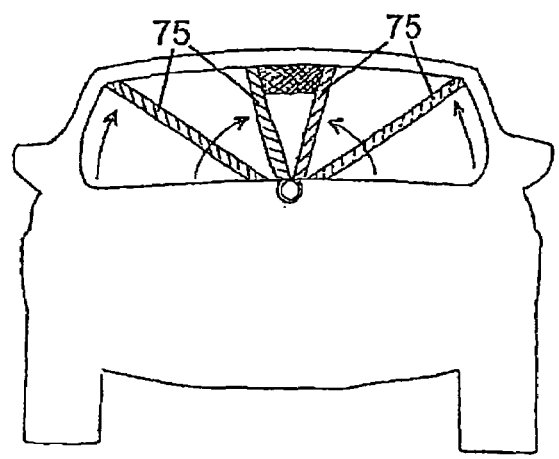
Figure 59:
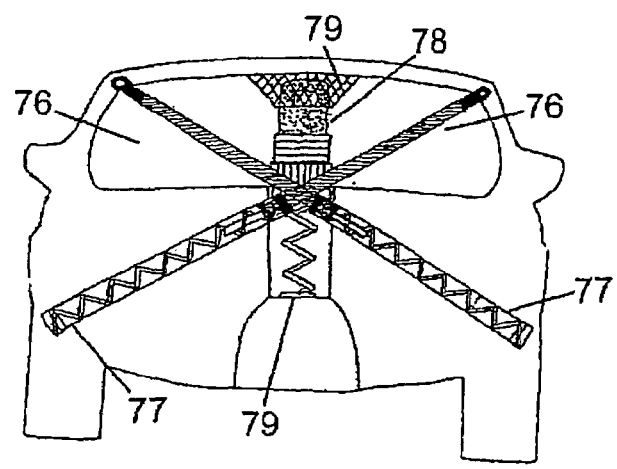

In FIGS. 55-57, various further types of strengthening member are shown. FIG. 48A-C and 54A-C show further embodiments of strengthening member according to the second aspect of the invention, in different stages of development. FIG. 58 shows how a plurality of strengthening member units 75 can be provided which pivot upwards from a storage position adjacent the lower edge of a windscreen to which pivot upwards from a storage position adjacent the lower FIG. 59 shows in more detail a strengthening member according to the second aspect of the invention. The strengthening member is comprised of a number of strengthening member units. There are two linearly extending strengthening member units 76 which are mounted in telescopically loaded mountings 77. In the storage position (not shown) the strengthening member units 76 do not extend beyond the lower edge of the windscreen and are not visible to the driver. When an impact, approaching object or rollover condition is detected, the strengthening members are released and moved, under the influence of the springs to the second position in which they come to rest in corners of the windscreen where they engage against parts of the frame in which the windscreen is held so that movement of the extended strengthening member units into the vehicle is prevented.

There is a further strengthening member unit 78 which comprises a three component telescopically extending unit. In the storage position (not shown) it is mounted in a spring load storage means 79. When a crash, approaching object or rollover is detected, the strengthening member unit 78 is released and, under influence of the spring, extends upwardly until it engages a structure 79 which holds it so that movement back into the passenger compartment is prevented. In this way, a strong structure is established across most of the windscreen.

Figure 60:
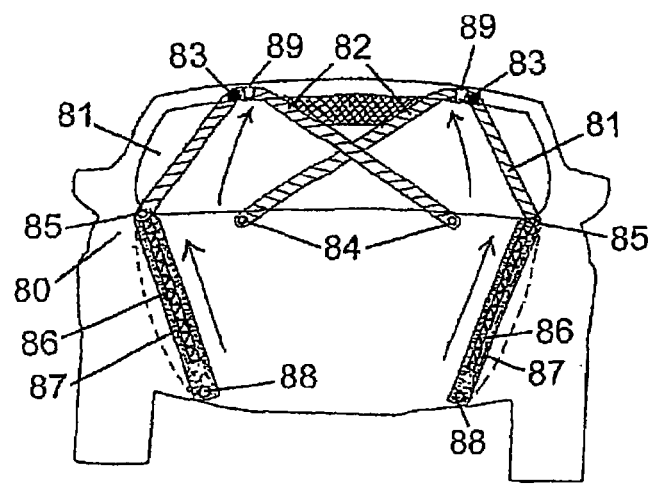

In FIG. 60, a strengthening member is shown which comprises two strengthening member units 80. Each strengthening member unit 80 comprises an arm having two arm sections 81, 82 which are hinged in the middle at a hinge 83. The free end of each arm 82 is pivoted adjacent a lower edge of the windscreen at 84. The free end of the other arm 81 is mounted on a slider 85. The slider is acted against by a spring 86. The spring is held in a spring housing 87 which itself is pivoted at the bottom 88. In the storage position (not shown) each slider 85 is held near the base of the unit 87 so that the spring 86 is tightly compressed. In this position, each arm 82 comes to rest adjacent the lower edge of the windscreen but not visible to the driver. When an impact, rollover or approaching object is detected, an actuator releases each slider 85 so that it moves very quickly along the unit 87 to the top, raising each arm 82 and 81 so that a brace structure is formed adjacent the windscreen for resisting impacts. In the second position, the top parts of the arms 82 each come to rest in engaging means 89 which hold them so that movement in the longitudinal direction of the vehicle is resisted.

Figure 61:
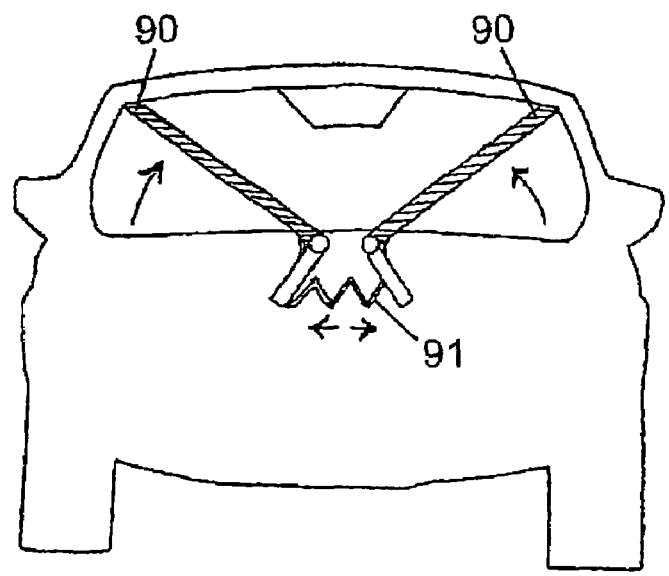

FIG. 61 shows a further embodiment of strengthening member according to the second aspect of the invention. In this case, pivoting strengthening members 90 are moved from a first position in which they lie adjacent to the front windscreen but below the level thereof, upwards to a second, reinforcing position by operating means in the form of a common spring 91.

Figure 62:
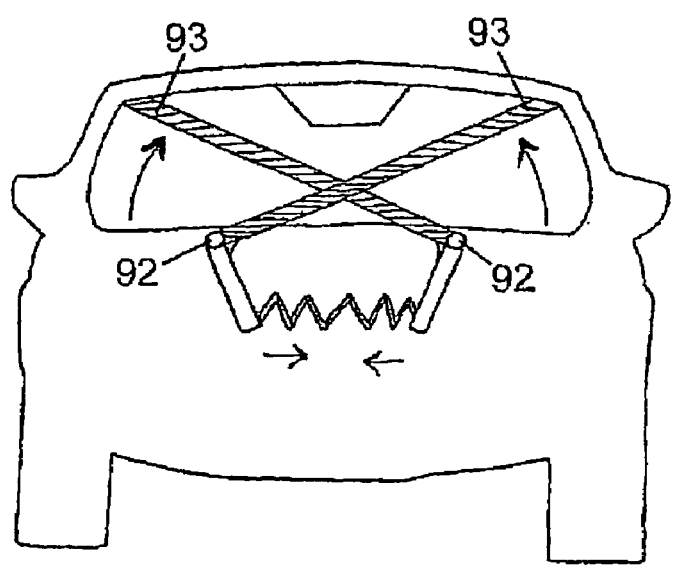

FIG. 62 shows a variation of this design in which the pivot points 92 of pivoting strengthening members 93 are located further apart than shown in FIG. 61.

FIGS. 63-74 show various embodiments of strengthening member according to the first aspect of the invention, mounted in a racing car. In each case, a fixed strengthening member is mounted in front of the driver and is configured so that it will not substantially interfere with the field of vision of the driver. Further, it is mounted in each case so that it does not substantially interfere with airflow entering the intake for the engine/cooler at the rear of the vehicle.

FIGS. 63, 64 and 65 show various views of a first embodiment, in which a narrow, longitudinally extending web 94 at the front of the member protects the driver from impact from objects to the front. It is supported at the rear by narrow lateral members .95

FIGS. 66, 67 and 67 show views from different directions of a second embodiment of reinforcing member according to the first aspect of the invention applied to a racing car. It simply comprises an upstanding strengthening member 96 extending from front to rear of the vehicle. A lightening hole 97 is formed at the bottom to reduce the weight while allowing a strong, arched structure to be formed.

FIGS. 69 and 70 show a further embodiment of strengthening member 97 which is similar to that shown in FIGS. 63-65. Similarly, FIGS. 71 and 72 show a fourth embodiment of strengthening member 98 which is similar to that shown in FIGS. 63-65.

The strengthening members of FIGS. 63, 64, 65, 66, 67 and 68 may be made static, according to the first aspect of the invention and as seen in the drawings, or as an active pop-out dynamic system according to the second aspect of the invention. They may be pre-tensioned, or activated by other means. They may be triggered by micro chipped sensor systems similar to all systems for FIG. 29 through to FIG. 62.

FIGS. 73 and 74 show a strengthening member which has two forwardly mounted strengthening member units 99 which are connected at the rear to a lateral arch member 100.

Strengthening members and strengthening structures described individually above may be combined in any suitable configurations in a vehicle.

For example, a dynamic pop-out protective curtain as shown in FIGS. 40A, 40B and 40C may be used in combination with the strengthening member of FIGS. 26A and 26B. They may be used in combination with air-bags on the outside and/or inside of the windscreen.

The present invention has been described above by way of example only and modification can be made within the invention, which extends to equivalents of the features described. The invention also consists in any individual features described or implicit herein or shown or implicit in the drawings or any combination of any such features or any generalization of any such features or combinations.

The invention claimed is:

1. A strengthening member for use in a road vehicle, for fixing to a structure of the vehicle, and for extending in front of the driver's position, the strengthening member being dimensioned so that, when in use, the strengthening member will not prevent the driver from seeing an object which is at least 2 m from the front windscreen, when the driver uses binocular vision and without requiring the driver to move the driver's head, wherein the strengthening member has the form of a triangular prism which has been sheared in a vertical plane or the form of a truncated sheared triangular pyramid.

2. A strengthening member for mounting in a vehicle, formed of at least three first linearly extending structural units placed in a triangular arrangemeent, for extending from the front structure of the vehicle and second linearly extending structural unit joining the at least three first linearly extending units, the second structural units being not horizontal, and wherein the first linearly extending structural units of the strengthening member have a width not exceeding 65 mm, the strengthening member having a connection for fixing the strengthening member to the vehicle, whereby, when mounted in the vehicle, the strengthening member extends obliquely to the vertical direction of the vehicle.

3. The strengthening member according to claim 2 wherein the strengthening member is an a-pillar.

4. A road vehicle comprising at least one strengthening member fixed to a structure of the vehicle and extending in front of the driver's position, wherein the strengthening member is dimensioned so that the strengthening member will not prevent the driver from seeing an object which is at least two meters from the front windscreen, when the driver uses binocular vision and without requiring the driver to move the driver's head, wherein the strengthening member has the form of a triangular prism which has been sheared in a vertical plane or a truncated sheared triangular pyramid.

5. The road vehicle according to claim 4, wherein the strengthening member is mounted within the passenger-carrying compartment of the road vehicle.

6. The road vehicle according to claim 4, wherein the strengthening member extends between the front structure of the vehicle and a top frame of the front windscreen.

7. The road vehicle according to claim 4, wherein the strengthening member does not contact the front windscreen along the whole length of the strengthening member 8. The road vehicle according to claim 4, wherein the strengthening member is formed of three first linearly extending structural units extending from the front structure of the vehicle to the top frame of the front windscreen and second linearly extending structural unit joining the three first linearly extending units.

9. The road vehicle according to claim 8, wherein the second structural units are not horizontal.

10. The road vehicle according to claim 8, wherein the first linearly extending structural units of the strengthening member have a width not exceeding 65 mm.

11. A road vehicle comprising at least one strengthening member fixed to a structure of the vehicle and extending in front of the driver's position, wherein the strengthening member is dimensioned so that the strengthening member will not prevent the driver seeing an object which is at least two meters from the front windscreen, when the driver uses binocular vision and without requiring the driver to the move the driver's head, wherein the strengthening member is formed of at least three first linearly extending structural units, extending from the front structure of the vehicle to the top frame of the front windscreen and at least two second linearly extending structural units joining the at least three first linearly extending units, at least two of the first linearly extending structural units lying substantially in line with the normal position of the driver.

* * * * *

Disclaimer

7,494,178 B2 - Jens H. S. Nygaard, Nerja-Malaga (ES). VEHICLE AND A STRENGTHENING MEMBER FOR A VEHICLE. Patent dated February 24, 2009. Disclaimer filed May 10, 2021, by the inventor.

I hereby disclaim the following complete claim 11 of said patent.

*(Official Gazette, September 13, 2022)*